(12) United States Patent
Hevesi et al.

(10) Patent No.: US 10,025,010 B2
(45) Date of Patent: Jul. 17, 2018

(54) SOLAR CONTROL GLAZING WITH LOW SOLAR FACTOR

(75) Inventors: Kadosa Hevesi, Jumet (BE); Jan Sicha, Jumet (BE)

(73) Assignee: AGC GLASS EUROPE, Brussels (BE)

( * ) Notice: Subject to any disclaimer, the term of this patent is extended or adjusted under 35 U.S.C. 154(b) by 691 days.

(21) Appl. No.: 13/696,911

(22) PCT Filed: May 25, 2011

(86) PCT No.: PCT/EP2011/058540
§ 371 (c)(1),
(2), (4) Date: Nov. 8, 2012

(87) PCT Pub. No.: WO2011/147864
PCT Pub. Date: Dec. 1, 2011

(65) Prior Publication Data
US 2013/0057951 A1 Mar. 7, 2013

(30) Foreign Application Priority Data
May 25, 2010 (BE) .................................. 2010/0310

(51) Int. Cl.
*G02B 5/28* (2006.01)
*G02B 5/20* (2006.01)
(Continued)

(52) U.S. Cl.
CPC .............. *G02B 5/208* (2013.01); *C03C 17/36* (2013.01); *C03C 17/366* (2013.01);
(Continued)

(58) Field of Classification Search
CPC . G02B 1/10; G02B 1/105; G02B 1/11; G02B 1/115; G02B 1/116; G02B 5/08;
(Continued)

(56) References Cited

U.S. PATENT DOCUMENTS 5,595,825 A    1/1997  Guiselin
6,280,848 B1 *  8/2001  Okumura et al. ............ 428/426
(Continued)

FOREIGN PATENT DOCUMENTS

EP    0 645 352       3/1995
WO    2006 122900    11/2006
(Continued)

OTHER PUBLICATIONS

U.S. Appl. No. 14/356,531, filed May 6, 2014, Hevesi.
(Continued)

*Primary Examiner* — Thong Nguyen
(74) *Attorney, Agent, or Firm* — Oblon, McClelland, Maier & Neustadt, L.L.P.

(57) ABSTRACT

The present invention relates to a substrate carrying a multilayer solar control stack, as well as to a multiple glazing incorporating at least one such sheet of glassy material carrying a solar control stack. The multilayer solar control stack comprises at least n functional layers based on a material which reflects infrared radiation and (n+1) transparent dielectric coatings such that each functional layer is surrounded by transparent dielectric coatings, n being greater than or equal to 3. The stack comprises at least one layer of metallic nature absorbing in the radiation which is visible inside the stack. The invention applies particularly to the formation of solar control glazings with low solar factor.

34 Claims, 1 Drawing Sheet

(51) Int. Cl.
  *C03C 17/36* (2006.01)
  *G02B 5/08* (2006.01)
(52) U.S. Cl.
  CPC ...... *C03C 17/3613* (2013.01); *C03C 17/3626* (2013.01); *C03C 17/3639* (2013.01); *C03C 17/3644* (2013.01); *C03C 17/3647* (2013.01); *C03C 17/3652* (2013.01); *C03C 17/3681* (2013.01); *G02B 5/0858* (2013.01)
(58) Field of Classification Search
  CPC .... G02B 5/0816; G02B 5/085; G02B 5/0858; G02B 5/0875; G02B 5/20; G02B 5/208; G02B 5/26; G02B 5/28; G02B 5/281; G02B 5/282; C03C 17/36; C03C 17/3613; C03C 17/3626; C03C 17/3639; C03C 17/3644; C03C 17/3647; C03C 17/3652; C03C 17/366; C03C 17/3681
  See application file for complete search history.

(56) References Cited

U.S. PATENT DOCUMENTS 6,316,110 B1 * 11/2001 Anzaki et al. ............... 428/432
8,557,391 B2 * 10/2013 Frank ...................... C03C 17/36
  428/434
2005/0123772 A1 * 6/2005 Coustet .................. C03C 17/36
  428/432
2006/0046073 A1 * 3/2006 Neuman ................. C03C 17/36
  428/432
2008/0311389 A1 12/2008 Roquiny et al.
2009/0047466 A1 2/2009 German et al.

FOREIGN PATENT DOCUMENTS

WO      2009 029466       3/2009
WO      2010-098200    *  9/2010 .................... 359/359

OTHER PUBLICATIONS

U.S. Appl. No. 13/696,882, filed Nov. 8, 2012, Hevesi, et al.
International Search Report dated Jul. 11, 2011 in PCT/EP11/58540 Filed May 25, 2011.

* cited by examiner

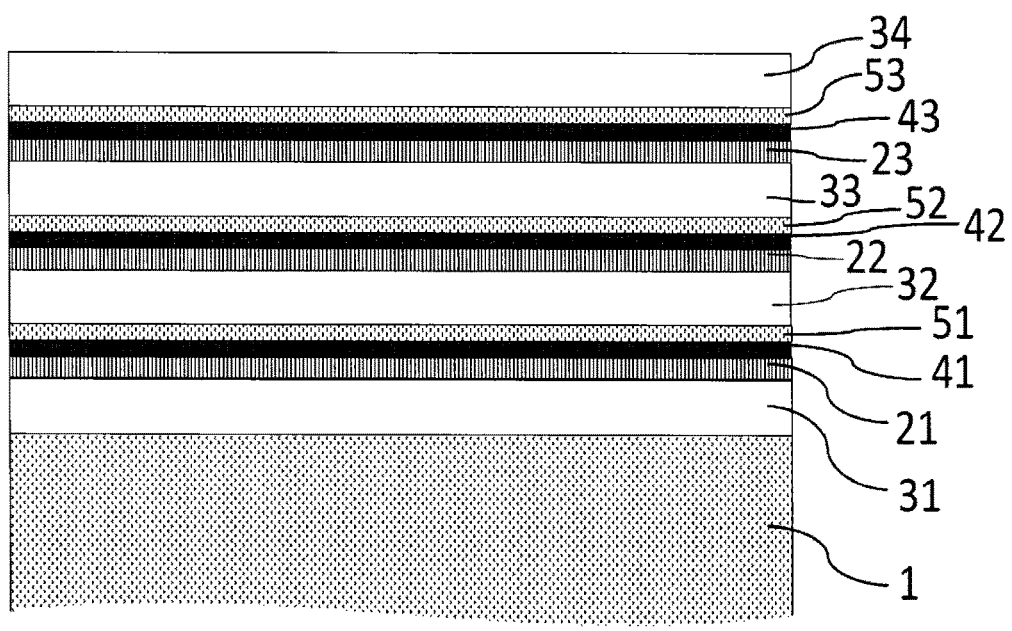

SOLAR CONTROL GLAZING WITH LOW SOLAR FACTOR

FIELD

The present invention relates to a transparent substrate bearing a solar-control multilayer stack and also to a multiple glazing incorporating at least one such transparent substrate bearing a solar-control multilayer stack.

BACKGROUND

The solar-control stacks, also referred to as solar-protection stacks, to which the present invention relates, comprise functional layers that reflect infrared radiation, such as silver-based layers, combined with which are antireflection dielectric coatings which serve to reduce the light reflection and to control other properties of the stack such as the color, but which also serve as tie and protective coatings for the functional layers. The solar-control stacks commonly contain two functional layers surrounded by dielectric layers. More recently, stacks containing three functional layers, or even more than three functional layers, have been proposed in order to further improve the solar protection while retaining the highest possible light transmission. Each functional layer is spaced out by at least one dielectric coating so that each functional layer is surrounded by dielectric coatings. The various layers of the stack are, for example, deposited by sputtering under reduced pressure enhanced by a magnetic field, in a well-known device of magnetron type. The present invention is not however limited to this particular layer deposition process.

These solar-control stacks are used in the production of solar-protection glazings, in order to reduce the risk of excessive overheating, for example of an enclosed space having large glazed surfaces, due to sunshine and thus to reduce the air-conditioning load to be accorded in summer. The transparent substrate then often consists of a sheet of glass, but it may also, for example, be formed of a plastic film such as a PET (polyethylene terephthalate) film which is then enclosed between two sheets of glass by means of an adhesive polymer film such as a PVB (polyvinyl butyral) or EVA (ethylene/vinyl acetate) film in order to form a laminated glazing, or enclosed on the inside of a multiple glazing.

In this case, the glazing must let as little as possible total energetic solar radiation pass through, that is to say that it must have a relatively low solar factor (FS or g). It is however highly desirable for it to guarantee a certain level of light transmission ($T_L$) so as to provide a sufficient level of illumination inside the building. These somewhat conflicting requirements express the wish to obtain a glazing having a high selectivity (S), defined by the ratio of the light transmission to the solar factor. These solar-control stacks also have a low emissivity which makes it possible to reduce the loss of heat by a long-wavelength infrared radiation. They thus improve the thermal insulation of large glazed surfaces and reduce energy losses and heating costs in a cold period.

The light transmission ($T_L$) is the percentage of the incident light flux, of illuminant D65, transmitted by the glazing in the visible range. The solar factor (FS or g) is the percentage of incident energetic radiation which is, on the one hand, directly transmitted by the glazing and, on the other hand, absorbed by the latter then radiated in the direction opposite the source of energy with respect to the glazing.

These solar-protection glazings are in general assembled into multiple glazings such as double or triple glazings in which the sheet of glass bearing the stack is combined with one or more other glass sheets, which may or may not be provided with coating, the multilayer solar-control stack being in contact with the internal space between the glass sheets.

In certain cases, there is cause to carry out an operation for mechanically strengthening the glazing, such as a thermal toughening of the glass sheet or sheets, in order to improve the resistance to mechanical stresses. It is also optionally possible to be caused to give a more or less complex curvature to the glass sheets for particular applications, with the aid of a high-temperature bending operation. In the processes for manufacturing and forming the glazings, there are certain advantages in carrying out these heat treatment operations on the already coated substrate instead of coating an already treated substrate. These operations are carried out at a relatively high temperature, at which temperature the functional layer based on an infrared-reflecting material, for example based on silver, has a tendency to deteriorate and to lose its optical properties and its properties with respect to infrared radiation. These heat treatments especially consist in heating the glassy sheet at a temperature above 560° C. in air, for example between 560° C. and 700° C., and especially at around 640° C. to 670° C., for a duration of around 6, 8, 10, 12 or even 15 minutes depending on the type of treatment and the thickness of the sheet. In the case of a bending treatment, the glassy sheet may then be bent to the desired shape. The toughening treatment then consists in suddenly cooling the surface of the flat or curved glassy sheet with jets of air or coolant in order to obtain a mechanical strengthening of the sheet.

In the case where the coated glass sheet must undergo a heat treatment, it is therefore necessary to take very particular precautions in order to produce a stack structure which is capable of undergoing a toughening and/or bending heat treatment, sometimes referred to hereinbelow by the expression "toughenable", without losing its optical and/or energy properties which give it its essential purpose. It is especially necessary to use dielectric materials, in order to form dielectric coatings, which withstand the high temperatures of the heat treatment without exhibiting a damaging structural modification. Examples of materials that are particularly suitable for this use are mixed zinc-tin oxide, and especially zinc stannate, silicon nitride and aluminum nitride. It is also necessary to make sure that the functional layers, for example based on silver, are not oxidized during treatment, for example by ensuring that there are, at the time of the treatment, sacrificial layers capable of oxidizing instead of the silver by capturing free oxygen.

It is also desirable for the glazings to meet certain esthetic criteria in terms of light reflection ($R_L$), that is to say the percentage of the incident light flux—of the illuminant D65—reflected by the glazing in the visible range, and of color in reflection and in transmission. Market demand is for glazing with a light reflection that is moderate but not too low in order to avoid the "black hole" effect when looking at a facade under certain low light conditions. The combination of a high selectivity with a moderate light reflection sometimes leads to purple colors in reflection being obtained which are not very esthetic.

Solar-protection glazing is also used in the field of motor vehicle glazing, for example windshields but also other windows of the vehicle such as the side windows, rear windows or roof windows. In this field, the windows are often laminated, that is to say that the substrate bearing the stack is combined with another transparent substrate, that may or may not bear a stack, by means of an adhesive plastic film generally made of PVB, the solar-protection stack being positioned on the inside of the laminate in contact with the PVB. Vehicle windows must generally be curved in order to adapt to the shape of the vehicle. When the substrate is a sheet of glass, the bending operation is carried out at a high temperature and the substrate equipped with its stack is hence subjected to a heat treatment similar to the toughening treatment, with or without rapid cooling, described above with, in addition, a forming operation while the substrate is at high temperature.

In order to reduce the amount of heat which enters the premises or the vehicle through the glazing, the invisible infrared heat radiation is prevented from passing through the glazing by reflecting it. This is the role of the functional layers based on a material that reflects infrared radiation. It is an essential element in the solar-control stack. However, a large part of the heat radiation is also transmitted by visible radiation. In order to reduce the transmission of this part of the heat radiation and to go beyond the elimination of the input of energy by the infrared radiation, it is necessary to lower the level of light transmission.

Several solutions have been proposed to improve solar protection while retaining the maximum light transmission, but no solution provides a truly satisfactory glazing.

Patent application US 2009/0047466 A1 by German et al proposes a multiple glazing, one glass sheet of which bears a stack having three silver-based functional layers in which the first and last dielectric coatings comprise a dielectric absorbent material consisting of TiN or NbN. The intermediate dielectric coatings are transparent and do not contain any absorbent material. The color obtained in reflection on the glass side is not satisfactory because it is not neutral enough and tends toward purple which is a color that is not right from a commercial viewpoint. Furthermore, although the proprietor states that the color is relatively stable, it is observed in FIGS. 9 and 10 that the dispersion of points shows that the color varies quite a lot, both in reflection on the substrate side and on the stack side, or during a variation of the thicknesses of layers of the stack.

Patent application WO 2009/029466 A1 in the name of PPG Industries describes a laminated glazing for a motor vehicle in which a glass sheet bears a stack having three silver-based functional layers. The silver layers have a decreasing thickness from the glass sheet which bears them. This document describes a stack having a high light transmission which may be used to form a motor vehicle windshield. However, for low solar factors, for example of the order of 25%, the optical properties obtained do not meet the esthetic criteria that are desired from a commercial viewpoint, in particular the color in reflection is distinctly purple and unstable during a variation of the angle of observation. Moreover, the selectivity obtained is relatively low.

Patent application EP 645352 A1 filed by Saint-Gobain Vitrage describes solar-protection glazing, the stack of which comprises three layers of silver having an increasing thickness starting from the glass. The solar-protection double glazing comprising this stack has a solar factor of 30 or 34% according to examples 1 and 2 of the document. There is a commercial demand for obtaining lower solar factors, while retaining a maximum light transmission, in order to obtain a better solar protection. Furthermore, a high selectivity is only obtained at the expense of the stability of the color in reflection during industrial manufacture.

BRIEF SUMMARY

One of the objects of the invention is to provide a transparent substrate bearing a solar-control multilayer stack which ensures effective solar protection with a high selectivity.

Another object of the invention is that the coated substrate has a pleasing appearance, both in transmission and in reflection on the substrate side, meeting commercial demand, for example in particular having a relatively neutral color.

Another object of the invention is to make it possible to more easily obtain a coated substrate that has a good angular stability of the color in reflection, that is to say it has a color variation of very low amplitude or of acceptable amplitude without major modification of the shade of the color.

Another object of the invention is to provide a coated substrate which has a low variation of the color in reflection observed on the substrate side when there is a fluctuation of the thicknesses of layers during the manufacturing time of a batch of coated substrates or a lack of transverse uniformity following a variable deposition rate over the length of the cathodes.

Another object of the invention is to provide a coated substrate that can easily be mass-produced on an industrial scale at an advantageous cost price.

The invention relates to a transparent substrate bearing a solar-control multilayer stack comprising at least n functional layers based on a material that reflects infrared radiation and (n+1) transparent dielectric coatings so that each functional layer is surrounded by transparent dielectric coatings, n being greater than or equal to 3, characterized in that the stack comprises at least one absorbent layer of metallic nature that is absorbent in the visible radiation spectrum and is located on the inside of the stack, and in that the ratio of the optical thickness of the transparent dielectric coating positioned between the second and third functional layer, starting from the substrate, to the optical thickness of the final transparent dielectric coating positioned beyond the last functional layer is between 1.25 and 3.0, preferably between 1.27 and 2.99.

It has been found that this combination of features facilitates the easy obtaining of a coated substrate with a high solar-protection performance, that is to say with a low solar factor, and with a high selectivity, which has a pleasant and stable esthetic appearance. It has also been found that it is possible to more easily attain a value of b* in transmission of less than 4, preferably of less than 3, and an angular variation, between 0° and 55° C., of a* in reflection on the substrate side of less than 3.5, preferably of less than 2.5.

This result is surprising because the presence of an absorbent layer of metallic nature tends to disrupt the delicate equilibrium between color, stability, solar factor and light transmission.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a cross sectional view of a transparent coated substrate of one embodiment of the invention having three functional layers.

DETAILED DESCRIPTION

A transparent dielectric coating is a coating which allows a light radiation to pass through without significant attenuation, that is to say that the extinction coefficient (k) is not sufficient to have an appreciable optical effect. For example, the extinction coefficient (k) at 550 nm is preferably less than 0.3 and advantageously less than or equal to 0.1.

The variation of the refractive index of the various materials according to the wavelength may be substantially different. Within the context of the present invention, the optical thickness of the transparent dielectrics will be calculated using the following formula:

optical thickness=$d$ multiplied by $n_v$, in which d is the geometric (physical) thickness of the layer in question and $n_v$ is a virtual refractive index obtained using the following formula:

$$n_v=(0.6902 \times n(550)^2)-(0.165 \times n(550))-0.4643$$

in which n(550) is the refractive index of the material at the wavelength of 550 nm.

If a transparent dielectric coating is composed of several layers, the total optical thickness of the transparent dielectric coating to be considered is the sum of the optical thicknesses of the various layers.

The metallic nature of the absorbent layer of metallic nature that is absorbent in the visible spectrum, hereinbelow denoted simply as absorbent layer, may for example be determined by an XPS (X-ray photoelectronic spectroscopy) analysis of the stack.

For the purposes of the invention, the presence of the absorbent layer in the stack and the light absorption property of the substrate bearing the stack due to this layer must be detected and measured in the finished product ready to be assembled in a multiple glazing or in a laminated glazing. Which means that if the coated substrate must undergo a high-temperature heat treatment, the absorbent layer must be present after the heat treatment. Specifically, a layer, such as a sacrificial layer, may be deposited in metallic form in the sputtering device (a magnetron for example) and be oxidized by the oxidizing plasma during the deposition of the next layer and/or be oxidized by the subsequent heat treatment of the coated substrate, so that the layer is no longer metallic in the finished product and that it is transparent to visible radiation.

For the purposes of the invention, it will be considered that the presence in the stack of the finished product of a material of metallic nature other than the material of the functional layers will be indicative of the presence of an absorbent layer in the stack. The materials customarily used to form the functional layers are materials based on silver, gold, platinum, copper or aluminum. These materials are used alone or as an alloy with a small amount of another element. For example, silver is often used with a small amount of palladium in order to improve its chemical resistance in particular. These elements have various degrees of performance for reflecting infrared radiation. If an element having a certain performance is used as functional layer, an element having a lower performance can also be used to form the absorbent layer. Moreover, any metal other than those cited above that is present in the finished product, as indicated above, could form the absorbent layer.

The material of the absorbent layer may optionally be slightly oxidized. However, a sub-oxidation as is understood here is not an oxide for which the degree of oxidation is slightly less than the stable stoichiometric level of the material in question such as is understood for rendering conductive a material which is insulating when it is completely oxidized for encompassing oxides which are not in the stable stoichiometric state. The atomic ratio of oxygen relative to the metal of the material of the absorbent layer of metallic nature is, depending on the material in question, at least 75%, preferably 70%, advantageously 60% and favorably 50% less than the atomic ratio of the stable stoichiometric oxide which is most commonly formed by the reactive sputtering technique under reduced pressure in a magnetron. The absorbent layer may for example be deposited in this highly sub-oxidized form. Preferably however, the absorbent layer is deposited in metallic form from a metallic target in a neutral atmosphere.

The metallic nature of a layer of this type may be demonstrated in particular by XPS profiling (X-ray photoelectronic spectroscopy profiling with a profiling gun using argon ions in the energy range from 1 to 3 keV) of the layer in question in the stack. Deconvolution analysis of the speciation of the chemical element or elements forming the absorbent layer may show the presence of the metallic state of one or more of these elements, attesting to the metallic nature of the layer. Given the sensitivity of this analysis technique, it is however quite possible that the speciation analysis of an absorbent layer of metallic nature also shows the presence of oxidized or nitrided forms of the constituent element or elements of the layer, for example due to pollution of the layer during manufacture or during profiling. The layer will however still be reputed to have a metallic nature. In certain cases, the signal intensity of the oxidized or nitrided forms could even be dominant compared to that of the metallic forms, but the presence alone of the signal linked to the metallic form on a portion of the layer will be sufficient to describe this layer as an absorbent layer of metallic nature. Indeed, as stated above in the case of sacrificial layers, a layer of metallic nature deposited in contact with another dielectric layer of oxide or of nitride may be significantly oxidized or nitrided, either by the deposition plasma of said dielectric layer deposited next, or by a subsequent heat treatment which enables the migration of oxygen or nitrogen originating from said dielectric layer to the layer of metallic nature. XPS analysis of the layer of metallic nature will then typically show a gradient in the speciation profile with a significant reduction of the signal of the metallic form on approaching the interface with said dielectric layer. In these scenarios, for an absorbent layer of metallic nature consisting of highly reactive materials, such as Ti or Zr, and having a thickness that is not very large, for example less than 7 nm, the XPS profiling analysis may also no longer show any trace of the pure metallic form) (Ti$^0$), especially due to a self-pollution of the interfacial zone of the layer of metallic nature toward the inside of the layer during the course of the profiling analysis. Signals will then be found in the XPS profiling analysis that originate from oxidized or nitrided forms which are each linked to a different oxidation stage of the constituent element or elements of the absorbent layer. These signals will have a gradient of intensity in the profile of the layer with a predominance of the signal originating from the lowest oxidation stage which will be established on moving away from the interface with the neighboring layer responsible for the interface oxidation or nitridation. Within the context of the present invention, for reactive elements having several stable oxidation stages, the predominance of the XPS signal linked to the lowest stable oxidation stage of the constituent element or elements of the absorbent layer on at least one portion of the absorbent layer is also considered to be proof of the metallic nature of said absorbent layer. For example, for an absorbent layer of titanium of metallic nature deposited under a mixed zinc-tin oxide layer, the analysis typically reveals three oxidation stages: Ti$^{2+}$, Ti$^{3+}$ and Ti$^{4+}$. The lowest oxidation stage for a layer of metallic nature of this type is therefore $Ti^{2+}$, the relative intensity of which will typically exceed 55% on the portion of the layer furthest from the neighboring oxide layer.

When the barrier layer for protecting the functional layer is a sacrificial metal layer, this layer is in fact oxidized and converted to a transparent dielectric in the finished product. Since this layer is very thin it has little influence on the optical properties. However, if the multilayer stack must withstand a high-temperature heat treatment such as toughening and/or bending, this sacrificial metal layer is rendered thicker in order to form a sufficient oxidizable metallic reserve in order to protect the functional layer. Substantially the entire thickness of this layer is converted to oxide. In the various thickness ratio calculations according to the invention including dielectric coating thicknesses, the thickness of this oxidized sacrificial metal layer must be included in the total thickness of the dielectric coating in question if its physical thickness in oxidized form exceeds 2.5 nm, which corresponds to around 1.4 nm of metal as deposited for a barrier made of Ti. The ratio calculations do not thus take into account the thin barrier layer customarily used in the stacks which must not undergo high-temperature heat treatment. The thickness of the portion of the layer that has possibly remained in metallic form, which may in particular act as an absorbent layer, should not of course be included. If an outer protective layer made of sacrificial metal is used to protect the stack awaiting heat treatment and is oxidized by this treatment in the finished product, the thickness of the oxidized layer must be counted in the ratio calculations. The same is also true if the sacrificial metal is nitrided and forms a transparent dielectric.

In the present description, when geometric thicknesses of layers of a multilayer stack are given, or when reference is made to geometric thicknesses, they are firstly measured in a comprehensive manner on the coated substrate with the aid of an X-ray fluorescence (XRF) device with wavelength dispersive detection (WDS). This device is calibrated for each material on the basis of 5 to 10 coated samples of the material in question in known thicknesses, distributed between 2 and 300 nm, both as single layers and as layers inserted into various stacks. If a material is present as multiple layers in a stack, the total thickness of this material is deduced from an XRF analysis as described above then the distribution of the total thickness over each of the individual layers of the stack is allocated with the aid of a profiling measurement of the stack, for example with the aid of XPS profiling, to which reference is made above. It should be noted here that in the literature, the thicknesses of the sacrificial layers, in particular, are, unlike the present invention, generally given in the form of an equivalent thickness of the corresponding oxide. For example, the thickness of the sacrificial layers for protecting the silver that are produced by deposition of metallic titanium on the silver, which is converted to $TiO_2$ under the action of the oxidizing plasma used to deposit the next dielectric layer, is in general given as an equivalent thickness of $TiO_2$ because it is the final material that is found in the completed coating and because it is in this form that the thickness is measured in the finished produced via calibration with $TiO_2$. The difference is significant. Indeed, in the case of titanium, the geometric thickness expressed as equivalent thickness of $TiO_2$ is nearly double the geometric thickness of the metallic titanium as deposited.

The presence of the absorbent layer in a stack containing three silver-based functional layers on a monolithic substrate made of standard clear glass having a thickness of 6 mm leads to a total light absorption of the coated substrate of at least 25%, preferably of at least 30% and more preferably of at least 35%.

Suitable metals for forming an absorbent layer include, in particular, NiCr, W, Nb, Ta, Ti, Zr, Cr, Ni, Mo, CoCr, Al, Y, Zn, Mg, alloys thereof and preferably Ti and its alloys. When the coated substrate must undergo a heat treatment, use is preferably made of one of the following metals: Pd, Au, Pt, Ir, Rh, Ru, Os and alloys thereof, or as an alloy with one of the other metals cited above at the beginning of the paragraph.

Preferably, the ratio of the optical thickness of the transparent dielectric coating positioned between the second and third functional layer, starting from the substrate, (hereinbelow also denoted as third transparent dielectric coating or D3) to the optical thickness of the final transparent dielectric coating positioned beyond the last functional layer is between 1.3 and 2.6, advantageously between 1.6 and 2.6. When there are only three functional layers (n=3), the last functional layer is the third starting from the substrate. If there are four functional layers, the last layer is the fourth, and so on if there are more than four functional layers.

The stability of the color in a large-scale mass production is an important element for guaranteeing the manufacture of a product of consistent quality. For comparison purposes, the variation of the color in reflection following a fluctuation of the thicknesses of the layers has been quantified with the aid of a mathematical formula. The index of color variation in manufacture has been called "Deltacol" and has been defined by the following equation:

$$Deltacol = 0.5 \times \left( \sqrt{\frac{\Delta a^*}{1.2}} + \sqrt{\frac{\Delta b^*}{2.4}} \right)$$

in which $\Delta a^*$ and $\Delta b^*$ are the differences between the highest values and the lowest values respectively of $a^*$ and of $b^*$ found when the thicknesses of each silver layer and of each transparent dielectric coating of the stack vary individually by plus or minus 2.5%. The values $a^*$ and $b^*$ are the CIELAB 1976 $L^*a^*b^*$ values measured under the illuminant D65/10°.

Preferably, the ratio of the optical thickness of the third transparent dielectric coating D3 to the optical thickness of the transparent dielectric coating positioned between the first and second functional layer (hereinbelow also referred to as second transparent dielectric coating or D2) is between 0.3 and 1.7, advantageously less than 1.1, and favorably less than 0.7. It has been found that this feature makes it possible to easily achieve a Deltacol value in reflection on the stack side of less than 8.

Preferably, this ratio is less than 0.7. It is thus easier to achieve a Deltacol value in reflection on the stack side of less than 5.5 and a Deltacol value in reflection on the substrate side of less than 2.65.

Preferably, the ratio of the optical thickness of the second transparent dielectric coating D2 to the optical thickness of the transparent dielectric coating positioned between the substrate and the first functional layer (hereinbelow also referred to as first transparent dielectric coating or D1) is between 1.15 and 3.4, advantageously between 1.2 and 3.

Preferably, the ratio of the optical thickness of the first transparent dielectric coating D1 to the optical thickness of the transparent dielectric coating positioned beyond the last functional layer is between 0.3 and 3.3, advantageously between 0.5 and 2.7 and favorably between 0.8 and 2.5. It is thus easier to achieve b* values in transmission of less than 1, or even at a negative.

Preferably, the ratio of the optical thickness of the third transparent dielectric coating D3 to the geometric thickness of the third functional layer starting from the substrate (hereinbelow also referred to has IR3) is between 6.3 and 13, advantageously between 6.4 and 11 and favorably between 6.6 and 10.

Preferably, the ratio of the geometric thickness of the third functional layer IR3 to the geometric thickness of the second functional layer starting from the substrate (hereinbelow also referred to as IR2) is between 0.45 and 2.8, advantageously between 0.5 and 1.7 and favorably between 0.5 and 1.2. These preferential values of the IR3/IR2 ratio make it possible to more easily achieve a Deltacol value in reflection on the stack side of less than 5.5.

Respecting these various ratios between the optical thicknesses of the transparent dielectric coatings and/or the geometric thicknesses of the functional layers discussed above favors the obtaining of a solar-control stack having high energy performance that has a pleasant and stable color and a high selectivity, very particularly when these ratios are all produced in combination. This stack may be easily mass produced in an industrial installation since it has a good color stability in a manufacturing tolerance that is easy to respect. It has been found that it is also possible to more easily obtain a level of reflection examined on the stack side that is lower and in particular less than 20%. In this way, the reflection inside premises, when the stack is placed at position 2 (position 1 conventionally being the outer face), is not too high so as not to restrict the vision through the coated substrate.

According to the invention, the absorbent layer of metallic nature that absorbs in the visible radiation spectrum is located on the inside of the stack, that is to say between the substrate and at least the last portion of the final transparent dielectric coating positioned beyond the last functional layer, so that there is always at least a significant thickness of transparent dielectric material on top of it, relative to the substrate. A final metallic protective outer layer which is sometimes used to protect the stack during a subsequent heat treatment, for example a layer of a few nm of Ti, and which will oxidize during said heat treatment in order to become a transparent oxide, is not considered to be an absorbent layer according to the invention. It is a protective outer layer which is not located on the inside of the stack.

According to one embodiment of the invention, a portion of a transparent dielectric coating is positioned between one of the functional layers and an absorbent layer so that the absorbent layer is on the inside of the transparent dielectric coating. In this embodiment, it will be preferred, without however this being a necessity for the implementation of the invention, to use a ceramic cathode for depositing the portion of transparent dielectric coating positioned between said absorbent layer and one of the neighboring functional layers in order to be able to deposit the functional layer and the absorbent layer, optionally with a separate sacrificial layer, in a same neutral or at the very least not very oxidizing atmosphere so as to facilitate the deposition process.

Preferably, said absorbent layer is positioned in the immediate vicinity of a functional layer. This arrangement has proved advantageous for various reasons. Not only is this proximity of the functional layer beneficial for obtaining a good optical result, but in addition, given that the absorbent layer has a metallic nature, it can be deposited in the same deposition zone under a neutral atmosphere as the functional layer, which facilitates the process for forming the stack. In the manufacture of a complex stack having a large number of layers, this is a significant advantage which limits the size of the device. Furthermore, the metallic nature of the absorbent layer makes it possible to obtain a relatively high deposition rate. This advantage, combined with the proximity of the functional layer, facilitates the stack-forming process which is already very sophisticated moreover due to the presence of at least three functional layers.

The expression "in the immediate proximity" should be understood to mean that there is no dielectric coating or portion of dielectric coating having a thickness of greater than 7 nm, preferably of greater than 5 nm, advantageously greater than 3 nm and even 1 nm, between the functional layer and the absorbent layer. On the other hand, this means that there can be, for example, a thin layer of oxide obtained from the sputtering of a ceramic target of oxide in a neutral atmosphere or an atmosphere containing a very low proportion of oxygen. It may be, for example, a thin layer based on $TiO_2$, optionally doped for example with zirconium or with niobium or in the form of a mixed oxide of $TiO_2$ with the oxides of Zr or Nb, or based on aluminum-doped ZnO, a thin layer obtained from a ceramic cathode of the corresponding oxide. It may also be a thin layer of $NiCrOx$, or a similar layer, for example followed by an absorbent layer of NiCr.

The absorbent layer, in the immediate vicinity of the functional layer, may be positioned on top or underneath the functional layer. Advantageously, it is positioned on top. This makes it possible to reduce the risk of heating of the stack when the incident radiation enters through the substrate, since a portion of the heat radiation is already reflected by the functional layer. When the stack risks heating beyond a certain level and when the substrate bearing the stack is made of glass, there is a risk of fracture of the substrate due to thermal shocks during the exposure of the glazing to sunshine with zones of shade. Therefore, the substrate must undergo a mechanical strengthening treatment in the form of a high-temperature thermal toughening, which leads to an increase in the production cost.

Preferably, the absorbent layer is positioned directly on a functional layer having a common interface with it. It is thus possible to combine the role of protecting the functional layer by a sacrificial layer with the role of absorbent layer in one and the same layer with the same material. The material of the absorbent layer may hence be one of the metals often used for the sacrificial layers, for example titanium, NiCr, Nb or Zr. This greatly simplifies the stack deposition process. It should clearly be understood in this case that a sacrificial layer as used in a known manner on the functional layer is largely oxidized, preferably completely oxidized, by the deposition plasma of the dielectric coating deposited next, so that this layer becomes essentially transparent for visible light. In the case where the absorbent layer also plays the role of sacrificial layer according to this preferred embodiment of the present invention, it will be thicker than a simple sacrificial layer. In this way it will remain, after possible oxidation by the deposition plasma of the following layer and optionally after any subsequent heat treatment resulting in the oxidation of this layer, such as a toughening and/or bending heat treatment, an absorbent layer for visible radiation which will also have, at least over one portion of its thickness, a metallic nature according to the definition given above. In this case, the layer as deposited will be thicker than what is necessary for obtaining the level of absorption required by the absorbent layer, one portion of this layer, playing the role of sacrificial barrier, becoming transparent during manufacture of the ready-to-use coated substrate. It should clearly be noted that the thickness of metal transformed to oxide during the deposition process depends on several factors and in particular on the speed of the conveyor transporting the substrate into the device for depositing layers in connection with the power applied to the cathodes (for a sputtering device), which results in a certain oxidizing level of the plasma and in a residence time in this plasma. This is why a distinction has been made in the description, in particular in the exemplary embodiments, between the absorbent portion, in the form of "absorbent layer" and the oxidized sacrificial portion, in the form of "protective layer" or "barrier layer", even if these two portions result in reality from the deposition of one and the same layer of a single material and the passage from one to the other takes place gradually by progressive oxidation.

Preferably, an absorbent layer is positioned between the first and second functional layers. This arrangement of the absorbent layer goes against the teaching of document US 2009/0047466 A1 cited above, but it has been found that it is thus possible, surprisingly, to easily obtain a very low solar factor, for example of less than 28% in double glazing and even lower than 26% than 24%, by limiting the energy absorption to 48% at most, preferably to 45% at most, which avoids the obligation of having to carry out a toughening heat treatment, that is to say a mechanical-strengthening heat treatment, in order to withstand thermal shocks without risk of the support breaking when the latter is made of ordinary glass or of a similar brittle material. Furthermore, this arrangement according to the invention makes it possible to easily obtain a light reflection observed on the substrate side which is not too low, for example at least 9 to 11%, in order to avoid a "black hole" effect when the glazing is observed under certain low ambient light conditions. This arrangement according to the invention also makes it possible to obtain a very good angular stability, and also a small variation of the color in reflection when there is a fluctuation of the thicknesses of layers during the time for manufacturing a batch of coated substrates or a lack of transverse uniformity following a variable deposition rate over the length of the cathodes.

According to one embodiment, the stack preferably comprises only a single absorbent layer. This advantageously simplifies the manufacturing process and facilitates the adjustment of the properties of the stack. On the one hand, the location of any absorbent material to a single place on the stack facilitates the manufacture thereof by the fact that the complexity of the structure of the stack is not increased by the existence of various sites of light absorption. On the other hand, the single location of light absorption provides a greater flexibility for the development of the optical properties of the stack and may in particular improve the angular stability of the color in reflection and increase the manufacturing tolerances.

According to another embodiment, the stack preferably comprises several absorbent layers, each of them being positioned in the immediate proximity of a functional layer. This arrangement makes it possible to distribute the light and energy absorption over the whole of the stack taking into account portions reflected by the functional layers.

As has been stated above, the functional layers are advantageously formed from noble metal. They may be based on silver, gold, palladium, platinum or a mixture or alloy thereof, but also based on copper or aluminum, alone, as an alloy with one another or as an alloy with one or more of the noble metals. Preferably, all the functional layers are based on silver. This is a noble metal which has a very high efficiency of reflection of infrared radiation. It is easily used in a magnetron device and its cost price is not prohibitive, in particular in respect to its efficiency. Advantageously, the silver is doped with a few percent of palladium, aluminum or copper, in a proportion, for example, of 1 to 10%, or else it is possible to use a silver alloy.

According to certain advantageous embodiments of the invention, there are four functional layers, which makes it possible to more easily obtain a particularly high selectivity for low solar factors. According to other advantageous embodiments of the invention, there are only three functional layers, which is a favorable compromise between obtaining a high selectivity and the complexity of the stack which influences the manufacturing costs.

Preferably, the absorbent layer has a thickness of at most 7 nm, advantageously at most 5.5 nm, favorably at most 4.5 nm and even 4 nm, and preferably of at least 0.5 nm, advantageously of at least 1 nm.

Preferably, when the multilayer solar-control stack is deposited on a sheet of standard soda-lime clear float glass having a thickness of 6 mm, the total light absorption $A_L$ of the coated monolithic glazing is at least 25%, and preferably of at least 30%. This light absorption value is measured on the finished product, that is to say that if the coated glass sheet is intended to undergo a high-temperature heat treatment such as a toughening and/or bending operation in order to form the finished product, the light absorption value is measured after this heat treatment. It is an advantageous ratio between the small amount of absorbent material used and the efficiency of the effect on the solar factor.

Preferably, the color variation Deltacol (as defined above) in reflection looked at on the substrate side is less than 3, advantageously less than 2.7, preferably less than 2.4 and preferably less than 2.2. Thus a coated substrate is obtained, the appearance of which in reflection on the substrate side is not very sensitive to the vagaries of mass production on an industrial scale which may lead to fluctuations in the thicknesses of the layers during production.

Preferably, the color variation Deltacol in reflection looked at on the stack side is less than 10, and advantageously less than 5. In the same way, a coated substrate is thus obtained, the appearance of which in reflection on the stack side is not very sensitive to the vagaries of mass production on an industrial scale which may lead to fluctuations in the thicknesses of the layers during production.

Preferably, the variations of a* and b* in reflection on the substrate side, during a variation of the angle of observation of between 0 and 55°, are at most 3.7 as an absolute value, advantageously at most 3.1. Preferably, the variation of a* in reflection on the substrate side, during a variation of the angle of observation between 0 and 55°, is between −3.1 and 2.5. This gives a particularly advantageous color stability, since the overall appearance of a facade varies little according to the angle of observation, for example according to the movement of the observer.

Preferably, when the multilayer solar-control stack is deposited on a sheet of standard soda-lime clear float glass having a thickness of 6 mm and when this coated sheet is mounted as double glazing with another sheet of standard soda-lime clear float glass having a thickness of 4 mm that is uncoated, the solar factor FS of the double glazing is less than 28%, advantageously less than 26% and the light transmission $T_L$ is less than 57%, advantageously less than 54% and preferably less than or equal to 51%. It is thus possible to obtain a transparent glazing that forms an effective solar-protection screen.

Preferably, the substrate bearing the stack has a selectivity of greater than 1.9, advantageously of greater than 1.94 and favorably of greater than 1.98 when the stack is deposited on a sheet of standard soda-lime clear float glass having a thickness of 6 mm and when this coated sheet is mounted as double glazing with another sheet of standard soda-lime clear float glass having a thickness of 4 mm that is uncoated.

Transparent dielectric coatings are well known in the field of layers deposited by sputtering. There are many suitable materials and it is pointless to make a list thereof here. They are in general oxides, oxynitrides or metallic nitrides. Among the most common, mention may be made, by way of example, of $SiO_2$, $TiO_2$, $SnO_2$, ZnO, ZnAlOx, $Si_3N_4$, AlN, $Al_2O_3$, $ZrO_2$, $Nb_2O_5$, YOx, TiZrYOx, TiNbOx, HfOx, MgOx, TaOx, CrOx and $Bi_2O_3$ and mixtures thereof. Mention may also be made of the following materials: AZO, ZTO, GZO, NiCrOx, TXO, ZSO, TZO, TNO, TZSO, TZAO and TZAYO. The expression "AZO" relates to an aluminum-doped zinc oxide or to a mixed oxide of zinc and aluminum, preferably obtained from a ceramic cathode formed by the oxide to be deposited, either in a neutral or slightly oxidizing atmosphere. Similarly, the expressions ZTO or GZO relate respectively to mixed oxides of titanium and zinc or of zinc and gallium, obtained by ceramic cathodes, either in a neutral or slightly oxidizing atmosphere. The expression TXO relates to titanium oxide obtained from a ceramic cathode of titanium oxide. The expression ZSO relates to a zinc-tin mixed oxide obtained either from a metallic cathode of the alloy deposited under an oxidizing atmosphere or from a ceramic cathode of the corresponding oxide, either in a neutral or slightly oxidizing atmosphere. The expressions TZO, TNO, TZSO, TZAO or TZAYO relate respectively to titanium-zirconium, titanium-niobium, titanium-zirconium-tin, titanium-zirconium-aluminum or titanium-zirconium-aluminum-yttrium mixed oxides, obtained from ceramic cathodes, either in a neutral or slightly oxidizing atmosphere. All these materials cited above may be used for forming the transparent dielectric coatings used in the present invention.

Preferably, at least one of the transparent dielectric coatings comprises at least one layer based on a zinc-tin mixed oxide containing at least 20% by weight of tin, for example around 50% in order to form $Zn_2SnO_4$. This oxide is very useful as a transparent dielectric coating in a stack capable of undergoing a heat treatment.

Preferably, the lower transparent dielectric coating positioned between the sheet of glassy material and the functional layer comprises at least one zinc-tin mixed oxide containing at least 20% by weight of tin, and the outer transparent dielectric coating also comprises at least one zinc-tin mixed oxide containing at least 20% by weight of tin. This arrangement is very favorable for protecting the absorbent layer and the functional layer both with respect to oxidation originating from the outside and oxygen originating from the glassy material.

Preferably, the transparent dielectric coating positioned under one or more functional layers comprises a layer based on a zinc oxide that is optionally doped, for example with aluminum or with gallium, in direct contact with the functional layer or layers. The zinc oxide may have a particularly favorable effect on the stability and corrosion resistance of the functional layer, especially when it is silver. It is also favorable to the improvement of the electrical conductivity of a silver-based layer, and therefore to obtaining a low emissivity, in particular during the heat treatment.

Advantageously, the transparent dielectric coating positioned under each functional layer comprises a layer based on a zinc-tin mixed oxide having no more than around 20% by weight of tin and at least around 80% by weight of zinc, preferably no more than around 10% of tin and at least around 90% of zinc, in direct contact with the functional layer or layers. This mixed oxide having a high content of zinc oxide under and in direct contact with the functional layer, particularly when it is based on silver, is advantageous for the resistance of the functional layer to the high-temperature heat treatment of the toughening and/or bending type. The combination of this mixed oxide containing a high content of zinc under the functional layer with a zinc-tin mixed oxide containing at least 20% by weight of tin in the lower and outer dielectrics constitutes the most advantageous structure for the good resistance of the stack during a high-temperature heat treatment.

Preferably, the substrate is a sheet of standard soda-lime-silica glass. This is the substrate best suited for serving as a base for solar-control glazing. Preferably, the substrate is a sheet of extra-clear glass having a light transmission of greater than 90%, or even greater than or equal to 91%, and even greater than or equal to 92%. One particularly preferred substrate is the glass sold under the trade mark CLEARVISION® by the company AGC Glass Europe.

According to one advantageous embodiment, the geometric thicknesses of the first, second and third functional layers (respectively IR1, IR2 and IR3), starting from the substrate, are increasing. This configuration, particularly when it is combined with a ratio of the optical thickness of D2 to the optical thickness of D1 between 1.25 and 3.1, and with a ratio of the optical thickness of D3 to the geometric thickness of IR3 between 6.3 and 13, facilitate the obtaining of a particularly high selectivity for a very low solar factor such as a solar factor of less than 28% in double glazing as discussed above, in particular a selectivity greater than or equal to 1.98, in combination with a color in transmission having a stronger blue component, without too pronounced a tendency toward the green/yellow domain, that is to say with a value of b* in transmission of less than or equal to 1, and preferably less than or equal to 0. Indeed, one particularly bothersome problem of high selectivity having a low solar factor is the natural tendency toward green colors that are not desired from a commercial viewpoint. This arrangement also makes it possible to obtain, at the same time, a light reflection examined on the glass side which is not too high, in particular less than 19% in double glazing, but above all it makes it possible to obtain light reflections as low as 8 to 9%. This arrangement also makes it possible to easily obtain a low value of Deltacol in reflection on the substrate side. Preferably, this embodiment is also combined with a ratio of the optical thickness of D3 to D2 of between 0.5 and 1.7, advantageously between 0.5 and 0.8 or between 1.25 and 1.7 and/or with a ratio of the geometric thickness of the layers IR3 to IR2 of between 1 and 2.8, advantageously between 1.8 and 2.8 and/or a ratio of the optical thickness of D3 to the optical thickness of the last transparent dielectric coating of between 1.6 and 3, advantageously between 2.35 and 2.75 and/or a ratio of the optical thicknesses of the coating D1 to the last transparent dielectric coating of between 0.3 and 2.1, advantageously between 1.4 and 2.4. It is also advantageous to respect all these ratios simultaneously.

According to another advantageous embodiment, the geometric thicknesses of the first, second and third functional layers, starting from the substrate, are decreasing. In this decreasing configuration of the thicknesses of the functional layers, the ratio of the optical thickness of the third transparent dielectric coating D3 to the geometric thickness of the third functional layer IR3 is preferably between 7 and 11. In this decreasing configuration of the thicknesses of the functional layers, the ratio of the optical thickness of the first transparent dielectric coating D1 to the optical thickness of the transparent dielectric coating positioned beyond the last functional layer is preferably between 1 and 2.5. This configuration, particularly in combination with said ratios, facilitates the obtaining of a low solar factor with a minimum of energy absorption, for example of less than or equal to 42% and even less than or equal to 39%, which is advantageous by the fact that it makes it possible to obtain a coated substrate having a very low solar factor, in particular between 23% and 25%, which does not require mechanical strengthening by heat treatment of the coated substrate as discussed above. Furthermore, this configuration makes it possible to easily obtain a very low variation of a* in reflection on the substrate side during a variation of the angle of observation between 0 and 55°, for example between −1.5 and 1.5. Preferably, this embodiment is also combined with a ratio of the optical thickness of D3 to D2 of between 0.3 and 0.7, and/or with a ratio of the geometric thickness of the layers IR3 to IR2 of between 0.5 and 1.1, and/or a ratio of the optical thickness of D3 to the optical thickness of the last transparent dielectric coating of between 1.3 and 2.6, and/or a ratio of the optical thicknesses of the coatings D2 to D1 of between 1.6 and 3. It is moreover advantageous to respect all these ratios simultaneously.

According to another advantageous embodiment, the geometric thickness of the second functional layer IR2 is at least 5%, preferably at least 10%, greater than the geometric thicknesses of the first and third functional layers. This configuration, particularly when it is combined with a ratio of the optical thickness of D3 to the geometric thickness of IR3 between 7.2 and 13, preferably between 7.2 and 10, and with a ratio of the optical thickness of D1 to the optical thickness of the last transparent dielectric coating between 1.3 and 3.3, preferably between 1.6 and 2.7, facilitates the obtaining of a low value of Deltacol in reflection on the layer side, in particular of less than 3. This arrangement also makes it possible to obtain, at the same time, a light reflection examined on the glass side which is high enough, in particular greater than 17% in double glazing, for example between 17 and 20%, so that the glazing gives a certain brilliance to the facade of the building if such is the desired effect. Preferably, this embodiment is also combined with a ratio of the optical thickness of D3 to D2 of between 0.4 and 1.1, advantageously between 0.4 and 0.75 and/or with a ratio of the geometric thickness of the layers IR3 to IR2 of between 0.4 and 0.9, and/or a ratio of the optical thickness of D3 to the optical thickness of the last transparent dielectric coating of between 1.75 and 3, and/or a ratio of the optical thicknesses of the coatings D2 to D1 of between 1.6 and 2.7. It is also advantageous to respect all these ratios simultaneously.

According to another advantageous embodiment, the geometric thicknesses of the three functional layers, starting from the substrate, are equal to within a difference of 10%, preferably equal to within 8% and advantageously equal to within 4%. This configuration, particularly when it is combined with a ratio of the optical thickness of D1 to the optical thickness of the last coating between 1.2 and 2.1, and with a ratio of the optical thickness of D3 to the optical thickness of D2 between 0.5 and 0.8, facilitates the obtaining of a bluish color in transmission, that is to say b* of less than 1, preferably of less than 0, and also a very low variation of a* in reflection on the substrate side during a variation of the angle of observation between 0 and 55°, for example between −1.2 and 0.8. Preferably, this embodiment is also combined with a ratio of the optical thickness of D3 to the geometric thickness of IR3 of between 8 and 10, and/or with a ratio of the geometric thickness of the layers IR3 to IR2 of between 0.9 and 1.1, and/or a ratio of the optical thickness of D3 to the optical thickness of the last transparent dielectric coating of between 2.15 and 2.6, and/or a ratio of the optical thicknesses of the coatings D2 to D1 of between 1.5 and 2.6. It is also advantageous to respect all these ratios simultaneously.

According to another advantageous embodiment, the geometric thickness of the second functional layer, starting from the substrate, is at least 10% less than the geometric thickness of at least one of the first and third functional layers and is less than or equal to the thickness of the other of these two functional layers. Preferably, the other of these two functional layers has a geometric thickness at least 4%, advantageously at least 8% and favorably at least 10% greater than the thickness of said second functional layer. This configuration, particularly when the ratio of the optical thickness of the transparent dielectric coating D3 to the optical thickness of the final transparent dielectric coating positioned beyond the last functional layer, starting from the substrate, is less than 2.6, preferably less than 2.2, advantageously less than 2, makes it possible to easily obtain a very low solar factor, for example of the order of 25%, combined with a high selectivity, for example, close to or at least 2, with a minimum of energy absorption, of the order of or even less than 40%. This ratio of the geometric thickness of D3 to the geometric thickness of the last transparent dielectric coating is favorably greater than 1.3. Furthermore, this configuration, combined with said ratio of the optical thicknesses of the third and last transparent dielectric coatings, makes it possible to easily avoid a green color in reflection on the substrate side without risk of obtaining a purple color, that is to say a* of greater than −5, preferably between −1 and −3, while having a light reflection on the substrate side that is high enough in order to avoid the "black hole" effect but that is not too high in order to avoid dazzle, for example of the order of 16 to 20% in double glazing. Preferably, this embodiment is also combined with a ratio of the optical thickness of D3 to the geometric thickness of IR3 of between 6.6 and 10, preferably between 7 and 9.2, and also with a ratio of the geometric thickness of the layers IR3 to IR2 of between 1 and 2.6, and/or a ratio with the optical thickness of D3 to D2 of between 0.4 and 1.1, and/or a ratio of the optical thickness of D1 to the optical thickness of the last transparent dielectric coating of between 0.5 and 2.7, and/or a ratio of the optical thicknesses of the coatings D2 to D1 of between 1.15 and 3.4. It is also advantageous to respect all these ratios simultaneously. It has been found that this makes it possible to reduce the green coloration of the color in reflection on the substrate side, for example a* greater than or equal to −4, preferably greater than −3 and even greater than −2. Furthermore, this also makes it possible to obtain particularly low energy absorption values, for example of less than 40% and even of less than 38%.

The invention extends to multiple glazing comprising at least one substrate bearing a solar-control multilayer stack as described above. The substrate is preferably a sheet of standard soda-lime glass. Preferably, the substrate is a sheet of extra-clear glass having a light transmission of greater than 90%, or even greater than or equal to 91%, and even greater than or equal to 92%. One particularly preferred substrate is the glass sold under the trade mark CLEARVISION® by the company AGC Glass Europe. The invention provides a very useful solar-protection multiple glazing.

The coated substrate of the multilayer stack is preferably assembled as multiple glazing, for example as double or triple glazing, so that, when it is mounted on a building, the solar radiation firstly strikes the coated glass sheet on the side without the stack, then the stack, then the second glass sheet, and then optionally the third if it is triple glazing. The stack is therefore, according to the convention generally used, in position 2. It is in this position that the solar protection is the most effective.

Preferably, when the substrate bearing the multilayer stack is a sheet of 6 mm standard clear glass and when it is mounted as double glazing with a sheet of standard clear glass with no coating having a thickness of 4 mm, the double glazing thus formed has a solar factor of less than 30%, for example between 23 and 26%, a light transmission greater than or equal to 44%, an external light reflection, therefore on the glass side of the coated glass sheet, of between 7 and 19%, preferably between 11 and 19%, with a bluish color in external reflection characterized by a value of b* of less than a*.

The invention also extends to a laminated glazing comprising at least one transparent substrate as described above joined to a sheet of glassy material by means of an adhesive plastic. Such glazing is advantageously used as glazing for a motor vehicle.

The invention will now be described in greater detail, in a non-limiting manner, with the aid of the preferred exemplary embodiments below.

One embodiment of the invention is shown in FIG. 1. A transparent substrate 1 is shown bearing a multilayer solar control stack. The multilayer stack comprises three functional layers 21, 22, 23, each functional layer comprising a material that reflects infrared radiation. Between the transparent substrate 1 and the first functional layer 21, between functional layers 21 and 22, and 22 and 23, and above the last functional layer 23, are deposited transparent dielectric coatings 31, 32, 33, 34. In this embodiment, metallic absorbent layers 41, 42, 43 are formed above each functional layer. However, in other embodiments only one absorbent layer may be present and the other absorbent layers are optional. Finally, above each absorbent layer in this embodiment are deposited barrier layers 51, 52, 53. As described elsewhere, the barrier layer may be optionally deposited as a portion of a thicker absorbent layer.

EXAMPLES

Example 1

A 2 m by 1 m sheet of standard soda-lime clear float glass having a thickness of 6 mm is placed in a sputtering device, enhanced by a magnetic field, at reduced pressure (around 0.3 to 0.8 Pa) of the magnetron type. On this glass sheet a multilayer solar-control stack is deposited in the manner explained below.

A first transparent dielectric coating is deposited on the glass sheet. This first coating is formed of two layers of zinc-tin mixed oxides deposited in a reactive atmosphere consisting of a mixture of argon and oxygen, from cathodes of zinc-tin alloys of different compositions. The first zinc-tin mixed oxide is formed from cathodes of a zinc-tin alloy containing 52% by weight of zinc and 48% by weight of tin in order to form the spinel structure of zinc stannate $Zn_2SnO_4$. The second zinc-tin mixed oxide $ZnSnO_x$, having a geometric thickness of around 9.2 nm, is deposited from targets of a zinc-tin alloy containing 90% by weight of zinc and 10% by weight of tin. The thickness of the first layer of zinc-tin mixed oxides is the balance with respect to the thickness of the second layer in order to achieve the geometric thickness corresponding to the optical thickness of the first transparent dielectric coating D1 indicated in table 1 below. In table 1, the thickness values are given in angstrom (Å).

An infrared-reflecting IR1 functional layer, formed of silver from a target of practically pure silver sputtered in a neutral atmosphere of argon is then deposited on the first transparent dielectric coating D1. The geometric thickness of this layer IR1 is given in table 1 in angstrom (Å).

A layer of titanium Ti is deposited from a titanium target in a neutral atmosphere directly onto the silver layer that has a common interface with it. Firstly, this layer serves as part of the absorbent layer Abs1 in the finished product. It is furthermore intended to also form a protective layer for the silver layer IR1, or barrier layer B1, as sacrificial metal. The oxidizing atmosphere of the plasma during the deposition of the following layer, described hereinbelow, will oxidize the sacrificial layer B1 of titanium. The total geometric thickness of the layer of Ti as deposited is sufficient so that there remains in the finished product some Ti of metallic nature which forms the absorbent layer Abs 1 having the geometric thickness specified in table 1 which is 1.3 nm for example 1. To obtain this thickness of absorbent layer in a finished product which is not heat treatable at high temperature, 2.7 nm of titanium were in fact actually deposited on the silver layer. The protective layer B1 therefore has a geometric thickness of 1.4 nm, indicated in angstrom in table 1. For a stack intended to undergo a toughening, bending and/or hardening treatment (which hardening treatment is a toughening treatment in which the rapid cooling is less pronounced), between 3.9 and 4.7 nm of titanium would be deposited under the same conditions. The thickness of the protective layer converted to oxide which exceeds 2.5 nm (value corresponding as oxide to 1.4 nm of geometric thickness of Ti of the protective layer B1 as deposited in the case of a non-toughenable stack) will have to be added to the thickness of the dielectric coating which follows for the calculation of the ratios according to the invention, therefore excluding of course metal that absorbs in the visible spectrum.

As a variant, it is also possible to deposit in addition, directly onto the absorbent layer Abs1 before depositing the following dielectric coating, a thin layer of 1 to 2 nm of TiOx or of ZnOx optionally doped with aluminum, in a neutral atmosphere starting from a ceramic cathode respectively of optionally doped titanium oxide or zinc oxide. This thin layer then constitutes the barrier layer B1 for protecting the silver and Ti of the absorbent layer. The total layer of Ti is then only 1.3 nm.

Similarly, the following layers are then deposited on the protective (barrier) layer B1:

A second transparent dielectric coating D2, a second functional layer IR2, a sacrificial layer B2 made of Ti of 1.4 nm that does not, in this example 1, constitute an absorbent layer in the finished product, a third transparent dielectric coating D3, a third functional layer IR3, a layer of Ti having a total geometric thickness of 2.8 nm are deposited on the layer B1. This last layer of Ti is intended to form, in the finished product, an absorbent layer Abs3, the 1.4 nm geometric thickness of which is indicated in table 1, and also a protective sacrificial layer B3, the geometric thickness of which is also 1.4 nm. The two absorbent layers are therefore, according to the invention, located on the inside of the stack. Next, a fourth and last transparent dielectric coating D4 is deposited on the layer of Ti. This fourth transparent dielectric coating D4 is formed of two layers of zinc-tin mixed oxides deposited in a reactive atmosphere constituted of a mixture of argon and oxygen from cathodes of zinc-tin alloys of different compositions. The first zinc-tin mixed oxide $ZnSnO_x$, having a geometric thickness of around 9.2 nm, is deposited from targets of a zinc-tin alloy containing 90% by weight of zinc and 10% by weight of tin, referred to hereinbelow as ZSO9. The second zinc-tin mixed oxide is formed from cathodes of a zinc-tin alloy containing 52% by weight of zinc and 48% by weight of tin in order to form the spinel structure of zinc stannate $Zn_2SnO_4$, referred to hereinbelow as ZSO5. The thickness of this second layer of zinc-tin mixed oxides is the balance with respect to the thickness of the first layer to attain the geometric thickness corresponding to the optical thickness of the fourth transparent dielectric coating D4 indicated in table 1 below.

The second and third infrared-reflecting functional layers, IR2 and IR3, are formed of silver from a target of practically pure silver sputtered in a neutral atmosphere of argon, in the same way as the layer IR1.

The second and third transparent dielectric coatings, respectively D2 and D3, are each respectively formed of two layers of zinc-tin mixed oxides deposited in a reactive atmosphere constituted of a mixture of argon and oxygen from cathodes of zinc-tin alloys of different compositions. The first zinc-tin mixed oxide of each of these two transparent dielectric coatings is formed from cathodes of a zinc-tin alloy containing 52% by weight of zinc and 48% by weight of tin in order to form the spinel structure of zinc stannate $Zn_2SnO_4$. The second zinc-tin mixed oxide $ZnSnO_x$, of each of these two transparent dielectric coatings, having a geometric thickness of around 18.4 nm, is deposited from targets of a zinc-tin alloy containing 90% by weight of zinc and 10% by weight of tin. The thickness of the first layer of zinc-tin mixed oxides of each of these two coatings is the balance with respect to the thickness of the second layer of each of these two coatings in order to achieve the geometric thickness corresponding respectively to the optical thicknesses of the second and third transparent dielectric coatings D2 and D3 indicated in table 1 below.

In table 1, the values of the various ratios of thicknesses of the transparent dielectric coatings and functional layers discussed above have also been indicated. As discussed above, these ratios are calculated without taking into account the thickness of the protective sacrificial metal layers B1, B2 and B3, each having 1.4 nm of Ti.

This coated glass sheet is then assembled as double glazing with another 4 mm sheet of clear glass, the coating being positioned on the side of the space inside the double glazing. The space between the two sheets is 15 mm and 90% of the air therein is replaced with argon. By observing the double glazing on the glass side of the coated substrate, the stack being placed at position 2, that is to say that firstly the glazing provided with the stack observed on the glass side, then the sheet of clear glass without layer are observed, the optical and thermal properties indicated in table 2 are noted. In the present invention, the following conventions are used for the measured or calculated values. The light transmission ($T_L$), the light reflection ($R_L$), the light absorption ($A_L$) (percentage of light flux—of illuminant D65—absorbed by the glazing in the visible range) are measured with illuminant D65/2°. As regards the color in reflection and the color in transmission, the CIELAB 1976 (L*a*b*) values are measured with illuminant D65/10°. The solar factor (FS or g) is calculated according to the EN410 standard.

In table 2 the values of selectivity (S) and of Deltacol are also indicated, and also the values of the variations of a* and b* in reflection on the substrate side during a variation of the angle of observation between 0 and 55°, respectively referred to as "Shift a*" and "Shift b*". Deltacol ($R_V$) means that the index of variation is obtained in reflection on the substrate side, whilst Deltacol ($R_C$) means that the index of variation is obtained on the stack side. For the values of colors, "($T_L$)" means that the value is measured in transmission, "($R_C$)" means that the value is measured in reflection on the stack (layer) side and "($R_V$)" means that the value is measured in reflection on the substrate (glass) side. Column $A_E$ of table 2 takes up the energy absorption values of the coated substrate as a simple sheet, calculated according to the EN410 standard.

It is observed that the colors in reflection obtained are agreeable and correspond to commercial demand. The level of reflection on the substrate side is not too low, which avoids the "black hole" while avoiding the mirror effect. The angular variations of color are low and perfectly acceptable, and the manufacturing stability is particularly good.

As a variant, the zinc-tin mixed oxide of the various transparent dielectric coatings was replaced by one of the following series of layers for D1, D2 and/or D3: $TiO_2$/ZnO:Al or TZO/$TiO_2$/ZnO or $SnO_2$/ZnO/$SnO_2$/ZnO or ZnO:Al/ZSO5/ZnO, by one of the following series for D1: $Si_3N_4$/ZnO or AlN/ZnO, and one of the following series for D4: ZnO/$SnO_2$ or ZnO/TZO or ZnO:Al/ZSO5 or ZnO/$SnO_2$/$Si_3N_4$ or ZnO/$SnO_2$/AlN, optionally with an outer protective layer. Each time, the geometric thicknesses of the various constituents were adapted as a function of their virtual refractive index (as described above) in order to obtain the optical thickness of the corresponding transparent dielectric coating as indicated in table 1. The actual refractive indices n(550), at the wavelength of 550 nm, of the dielectric materials used are the following: for $TiO_2$, n(550)=2.5; for $Si_3N_4$, n(550)=2.04; for $Al_2O_3$, n(550)=1.8; for ZSO5 and ZSO9, n(550)=2.03; for AlN, n(550)=1.9; and for TZO, n(550)=2.26. Substantially the same properties were obtained.

According to other variants, use is made of Nb, Cu, a ZnAl alloy, a ZnTi alloy, Cr, Zn or NiCr in order to form the absorbent layers Abs1 and Abs3. At the time of deposition, a sufficient thickness was deposited in order to obtain the same total light absorption value on the finished product. The sacrificial layer on IR2 was Ti.

According to yet other variants, in the transparent dielectric coating D4, the sequence of zinc-tin mixed oxides was replaced by the sequence ZnO:Al/$TiO_2$ or TZO, by the sequence ZnO:Al/$SnO_2$/$TiO_2$ or TZO, or else by the sequence ZnO:Al/ZSO5/$TiO_2$ or TZO.

According to another variant, the barrier layer B2, formed of sacrificial metal Ti, is replaced by a TXO layer, that is to say a $TiO_2$ layer obtained from a ceramic cathode of $TiO_x$ by sputtering in a neutral or slightly oxidizing atmosphere. This makes it possible to reduce the emissivity of the stack.

Examples 2 to 29

Examples 2 to 29 were carried out in the same manner, according to the same structures and with the same materials as example 1. In these examples however, the optical thicknesses of the various coatings and the geometric thicknesses of the various functional layers were modified according to the indications of table 1. As regards the transparent dielectric coatings, the same principle as in example 1 was used, that is to say that they are formed of two layers, one of the layers of which has a fixed thickness and the other layer has a complementary thickness in order to obtain the optical thickness indicated in the table. As regards the various absorbent layers, when one of the values Abs1, Abs2 or Abs3 is zero, this means that there is no absorbent layer at this location of the stack in the finished product and that the sacrificial layer Ti used has been converted to oxide TiOx during the process for depositing the following layers. The non-zero values indicated in columns Abs1, Abs2, Abs3 correspond to the geometric thicknesses of the absorbent layers in the finished product. As is seen in the table, all the absorbent layers are positioned on the inside of the stack.

As a variant, the barrier layers B2 and/or B3 are formed by a layer TXO, that is to say a layer $TiO_2$ obtained from a ceramic cathode of $TiO_x$ by sputtering in a neutral or slightly oxidizing atmosphere. The emissivity of the stack thus manages to be reduced and therefore the selectivity manages to be improved.

Comparative Example 1

Comparative example 1 (C1), listed in tables 1 and 2, shows a stack outside of the invention, the structure of which is described by patent application US 2009/0047466 A1 by German et al.

In this comparative example, there is no transparent dielectric coating D1, it is an absorbent layer of 9 nm of TiN deposited on the glass that forms, at the same time, a light-absorbing dielectric coating. The protective layers B1 and B2 are formed from 5 nm of $TiO_2$, deposited from a ceramic cathode of $TiO_2$, the transparent dielectric coatings D2 and D3 are formed of ZnSnOx, the absorbent layer Abs3 is formed of TiN and D4 is formed of $Si_3N_4$. The three functional layers are formed of silver. The substrate is made of glass.

In the ratios indicated in table 1, the absorbent layer TiN on the glass is not counted as a dielectric since it is not transparent. The optical thicknesses are calculated according to the formula indicated above using the virtual refractive index. The refractive index n(550) of silicon nitride is 2.04, that of zinc-tin oxide is 2.03 and the refractive index n(550) of $TiO_2$ is 2.5. For the calculations, the thickness of the barriers of $TiO_2$ that exceed 2.5 nm, i.e. 2.5 nm (5 nm-2.5 nm), is added to the thickness of the corresponding transparent dielectric coating.

The properties indicated in table 2 for this example C1 were calculated according to EN410 on the basis of the spectral data disclosed in the document by German et al. It is observed that the properties obtained are not satisfactory, and in particular the colors in reflection are highly colored and the light reflections are very low, which gives a "black hole" effect particularly in reflection on the substrate side.

Example 30

Example 30 is an exemplary embodiment of the invention which comprises four functional layers of silver. There are hence five transparent dielectric coatings, the fifth transparent dielectric coating being referred to as D5.

The composition of the various transparent dielectric coatings is the same as in example 1, except that in example 30 the coating D4 has the same composition as the transparent dielectric coating D3 from example 1 and that the transparent dielectric coating D5 has the same composition as the transparent dielectric coating D4 from example 1.

The optical thickness of the coating D1 is 38.3 nm, that of coating D2 is 81.8 nm, that of coating D3 is 123.8 nm, that of coating D4 is 171.5 nm, and that of coating D5 is 72.5 nm. The geometric thicknesses of the functional layers made of silver are respectively the following: IR1=4 nm, IR2=9.8 nm, IR3=14 nm and IR4=18 nm. Deposited on the first layer of silver IR1, was a standard protective layer made of sacrificial metal of 1.4 nm which became transparent in the finished product. A protective layer made of sacrificial metal Ti, intended to form, at the same time, the absorbent layer Abs2 in the finished product, is deposited from a titanium target in a neutral atmosphere directly onto the silver layer IR2 having a common interface with it. The oxidizing atmosphere of the plasma during the deposition of the following layer will partially oxidize this layer of titanium. The geometric thickness of the layer of Ti as deposited is sufficient so that there remains in the finished product some Ti of metallic nature which forms the absorbent layer Abs2 having a thickness of 4 Å. In order to obtain this thickness of absorbent layer in a finished product which is not heat-treatable at high temperature, 1.8 nm of titanium were in fact actually deposited on the layer of silver. In the same way, a layer of 2.3 nm of Ti was deposited on the silver layer IR3 so as to obtain an absorbent layer Abs3 of 9 Å in the finished product.

The properties obtained are the following: the selectivity is 2.036; the energy absorption is 42.7%; the solar factor g is 24.5%; the light transmission $T_L$ is 49.9%. The color in transmission is represented by the following values: $a^*_{TL}=-6.5$; $b^*_{TL}=-1$. The color in reflection on the stack side is represented by the following values: $L^*_{RC}=43.3$; $a^*_{RC}=-5.5$; $b^*_{RC}=-2.5$. The color in reflection on the substrate side is represented by the following values: $L^*_{RV}=39.3$; $a^*_{RV}=-2.2$; $b^*_{RV}=-3.4$. The variations of color in reflection on the substrate side according to the angle of observation (between 0 and 55°) are the following: Shift $a^*=-2.4$; Shift $b^*=0.5$. The index of variation Deltacol ($R_V$) is 1.2.

Examples 31 to 36

Examples 31 to 36 are carried out in the same way and according to structures similar to examples 1 to 27. The differences are specified below.

In example 31, the transparent dielectric coating D1 is formed from an optical thickness of 57 nm of $Si_3N_4$ and from an optical thickness of 19 nm of ZnO; the transparent dielectric coating D2 is formed from an optical thickness of 118.6 nm of $Si_3N_4$ and from an optical thickness of 39.5 nm of ZnO; the transparent dielectric coating D3 is formed from an optical thickness of 39.1 nm of $Si_3N_4$ and from an optical thickness of 26 nm of ZnO; and the transparent dielectric coating D4 is formed from an optical thickness of 17.9 nm of ZnO and from an optical thickness of 26.9 nm of $Si_3N_4$.

In example 32, the transparent dielectric coating D4 is formed from an optical thickness of 17.9 nm of ZnO and from an optical thickness of 26.9 nm of $Al_2O_3$. The transparent dielectric coatings D1, D2 and D3 are formed from the same materials as examples 1 to 27 and according to the same conditions.

In example 33, the transparent dielectric coating D1 is formed from an optical thickness of 57 nm of $TiO_2$ and from an optical thickness of 19 nm of ZnO. The transparent dielectric coatings D2, D3 and D4 are formed from the same materials as examples 1 to 27 and according to the same conditions.

In example 34, the transparent dielectric coating D1 is formed from an optical thickness of 57 nm of ZSO5 and from an optical thickness of 19 nm of ZnO; the transparent dielectric coating D2 is formed from an optical thickness of 20.5 nm of ZnO:Al (ZnO doped with 2% by weight of Al), from an optical thickness of 118.6 nm of ZSO5 and from an optical thickness of 19 nm of ZnO; the transparent dielectric coating D3 is formed from an optical thickness of 13 nm of ZnO:Al (ZnO doped with 2% by weight of Al), from an optical thickness of 39.1 nm of ZSO5 and from an optical thickness of 13 nm of ZnO; and the transparent dielectric coating D4 is formed from an optical thickness of 17.9 nm of ZnO:Al (ZnO doped with 2% by weight of Al), from an optical thickness of 23.5 nm of ZSO5 and from an outer layer, that is part of the transparent dielectric coating D4, of 3.4 nm of optical thickness of $TiO_2$ deposited on the layer of ZSO5.

In examples 35 and 36, the structures are again similar to examples 1 to 27, but the absorbent layer Abs1 has been modified. In example 35, the absorbent layer Abs1 is formed of 2.3 nm of Cr. At the time of the deposition, a geometric thickness of 2.3 nm of Cr is deposited from a metallic cathode of Cr sputtered in a neutral atmosphere, and then 1.4 nm of Ti is deposited which acts as a protective sacrificial layer B1, the latter oxidizes during the deposition of the second dielectric coating in order to form transparent $TiO_2$. In example 36, the absorbent layer Abs1 is formed of 1.8 nm of Zn. At the time of the deposition, a geometric thickness of 1.8 nm of Zn is deposited from a metallic cathode of Zn sputtered in a neutral atmosphere, and next 1.4 nm of Ti is deposited which acts as a protective sacrificial layer, the latter oxidizes during the deposition of the second dielectric coating in order to form transparent $TiO_2$. The properties are given in table 2 below.

Examples 37 and 38

Examples 37 and 38 are also produced in the same way according to structures similar to examples 1 to 27. The differences are specified below.

In example 37, the absorbent layer Abs3' of metallic nature is positioned under the functional silver layer IR3. It is a layer of Ti of 1.2 nm of geometric thickness.

In example 38, the absorbent layer of metallic nature that absorbs in the visible spectrum consists of a geometric thickness of 1.5 nm of Pd inserted between two layers of $Si_3N_4$ having an optical thickness of 23.6 nm each, the whole assembly being placed between the protective layer B1 and the transparent dielectric coating D2. In table 1, the value of 15 Å for the absorbent layer has been placed between parentheses in the column Abs1 in order to signify that this layer is not in fact in the correct location in the sequence of the actual structure, since the absorbent layer is in reality beyond the layer B1, enclosed between two $Si_3N_4$ layers. The sequence is in reality the following: . . . /IR1/B1/$Si_3N_4$/Abs1/$Si_3N_4$/ZSO5/ZSO9/IR2/ . . . . The optical thickness of ZSO5 is 69.2 nm and the optical thickness of ZSO9 is 29.6 nm, to which it is necessary to add the optical thicknesses of the two layers of $Si_3N_4$, which makes a total of 146 nm for the transparent dielectric coating as indicated in column D2 of table 1.

TABLE 1

| Ex. | D1 | IR1 | Abs1 | B1 | D2 | IR2 | Abs2 | B2 | D3 | Abs3' | IR3 | Abs3 | B3 | D4 | D1/D4 | D3/D2 | IR3/1R2 | D3/D4 | D3/IR3 | D2/D1 |
|---|---|---|---|---|---|---|---|---|---|---|---|---|---|---|---|---|---|---|---|---|
| 1 | 820 | 138 | 13 | 14 | 1566 | 118 | 0 | 14 | 1005 | | 95 | 13 | 14 | 399 | 2.06 | 0.64 | 0.81 | 2.52 | 10.58 | 1.91 |
| 2 | 810 | 165 | 11 | 14 | 1626 | 102 | 5 | 14 | 808 | | 88 | 5 | 14 | 412 | 1.96 | 0.50 | 0.86 | 1.96 | 9.20 | 2.01 |
| 3 | 840 | 155 | 35 | 14 | 1601 | 116 | 0 | 14 | 591 | | 64 | 0 | 14 | 363 | 2.31 | 0.37 | 0.55 | 1.63 | 9.20 | 1.91 |
| 4 | 793 | 154 | 28 | 14 | 1569 | 104 | 0 | 14 | 641 | | 81 | 0 | 14 | 434 | 1.83 | 0.41 | 0.77 | 1.48 | 7.94 | 1.98 |
| 5 | 930 | 100 | 13 | 14 | 1642 | 165 | 0 | 14 | 1435 | | 142 | 19 | 14 | 639 | 1.46 | 0.87 | 0.86 | 2.25 | 10.08 | 1.77 |
| 6 | 1005 | 95 | 14 | 14 | 1653 | 164 | 0 | 14 | 1450 | | 143 | 20 | 14 | 660 | 1.52 | 0.88 | 0.87 | 2.20 | 10.11 | 1.64 |
| 7 | 832 | 115 | 10 | 14 | 1763 | 147 | 1 | 14 | 781 | | 91 | 7 | 14 | 357 | 2.33 | 0.44 | 0.62 | 2.18 | 8.58 | 2.12 |
| 8 | 857 | 114 | 11 | 14 | 1767 | 152 | 0 | 14 | 801 | | 80 | 11 | 14 | 296 | 2.89 | 0.45 | 0.52 | 2.70 | 10.05 | 2.06 |
| 9 | 886 | 116 | 10 | 14 | 1722 | 138 | 0 | 14 | 866 | | 104 | 10 | 14 | 397 | 2.23 | 0.50 | 0.76 | 2.18 | 8.30 | 1.94 |
| 10 | 903 | 115 | 11 | 14 | 1697 | 134 | 0 | 14 | 888 | | 109 | 10 | 14 | 414 | 2.18 | 0.52 | 0.82 | 2.14 | 8.11 | 1.88 |
| 11 | 825 | 130 | 14 | 14 | 1521 | 122 | 2 | 14 | 1065 | | 118 | 8 | 14 | 464 | 1.78 | 0.70 | 0.97 | 2.30 | 9.05 | 1.84 |
| 12 | 908 | 115 | 11 | 14 | 1591 | 128 | 0 | 14 | 1065 | | 127 | 13 | 14 | 464 | 1.96 | 0.67 | 0.99 | 2.30 | 8.39 | 1.75 |
| 13 | 666 | 148 | 27 | 14 | 1345 | 65 | 0 | 14 | 841 | | 126 | 0 | 14 | 617 | 1.08 | 0.63 | 1.94 | 1.36 | 6.67 | 2.02 |
| 14 | 664 | 161 | 23 | 14 | 1459 | 82 | 0 | 14 | 758 | | 108 | 0 | 14 | 540 | 1.23 | 0.52 | 1.32 | 1.40 | 6.99 | 2.20 |
| 15 | 786 | 157 | 23 | 14 | 1489 | 95 | 0 | 14 | 768 | | 102 | 0 | 14 | 489 | 1.61 | 0.52 | 1.07 | 1.57 | 7.51 | 1.89 |
| 16 | 966 | 123 | 12 | 14 | 1525 | 116 | 4 | 14 | 1093 | | 128 | 9 | 14 | 481 | 2.01 | 0.72 | 1.10 | 2.27 | 8.54 | 1.58 |
| 17 | 1052 | 150 | 19 | 14 | 1468 | 108 | 0 | 14 | 953 | | 118 | 0 | 14 | 485 | 2.17 | 0.65 | 1.09 | 1.96 | 8.10 | 1.40 |
| 18 | 952 | 115 | 12 | 14 | 1676 | 123 | 2 | 14 | 953 | | 125 | 7 | 14 | 458 | 2.08 | 0.57 | 1.02 | 2.08 | 7.63 | 1.76 |
| 19 | 962 | 112 | 15 | 14 | 1518 | 127 | 0 | 14 | 1128 | | 133 | 11 | 14 | 487 | 1.97 | 0.74 | 1.05 | 2.31 | 8.47 | 1.58 |
| 20 | 910 | 103 | 11 | 14 | 1619 | 157 | 7 | 14 | 1407 | | 161 | 8 | 14 | 680 | 1.34 | 0.87 | 1.02 | 2.07 | 8.75 | 1.78 |
| 21 | 779 | 112 | 10 | 14 | 1564 | 143 | 8 | 14 | 1352 | | 150 | 9 | 14 | 605 | 1.29 | 0.86 | 1.05 | 2.23 | 9.04 | 2.01 |
| 22 | 796 | 97 | 13 | 14 | 1249 | 147 | 0 | 14 | 1695 | | 168 | 10 | 14 | 731 | 1.09 | 1.36 | 1.14 | 2.32 | 10.08 | 1.57 |
| 23 | 888 | 102 | 7 | 14 | 1356 | 152 | 8 | 14 | 1722 | | 173 | 10 | 14 | 717 | 1.24 | 1.27 | 1.14 | 2.40 | 9.94 | 1.53 |
| 24 | 410 | 56 | 2 | 14 | 1000 | 93 | 3 | 14 | 1600 | | 189 | 27 | 14 | 707 | 0.58 | 1.60 | 2.04 | 2.26 | 8.48 | 2.44 |
| 25 | 669 | 66 | 4 | 14 | 1141 | 93 | 8 | 14 | 1632 | | 223 | 1 | 14 | 656 | 1.02 | 1.43 | 2.40 | 2.49 | 7.33 | 1.71 |
| 26 | 744 | 83 | 9 | 14 | 1278 | 132 | 0 | 14 | 1650 | | 184 | 13 | 14 | 654 | 1.14 | 1.29 | 1.39 | 2.52 | 8.99 | 1.72 |
| 27 | 805 | 94 | 6 | 14 | 1326 | 142 | 9 | 14 | 1707 | | 177 | 11 | 14 | 678 | 1.19 | 1.29 | 1.25 | 2.52 | 9.62 | 1.65 |
| 28 | 871 | 159 | 27 | 14 | 1532 | 95 | 0 | 14 | 749 | | 99 | 0 | 14 | 496 | 1.76 | 0.49 | 1.04 | 1.51 | 7.55 | 1.76 |
| 29 | 976 | 126 | 13 | 14 | 1742 | 138 | 0 | 14 | 915 | | 93 | 15 | 14 | 335 | 2.91 | 0.53 | 0.67 | 2.73 | 9.89 | 1.79 |
| C1 | 0 | 100 | — | 50 | 1125 | 135 | — | 50 | 941 | | 100 | 60 | 14 | 104 | — | 0.85 | 0.74 | 6.34 | 10.27 | — |
| 31 | 761 | 163 | 29 | 14 | 1582 | 103 | 0 | 14 | 651 | | 81 | 0 | 14 | 448 | 1.70 | 0.41 | 0.78 | 1.45 | 8.09 | 2.08 |
| 32 | 761 | 163 | 29 | 14 | 1582 | 103 | 0 | 14 | 651 | | 81 | 0 | 14 | 448 | 1.70 | 0.41 | 0.78 | 1.45 | 8.09 | 2.08 |
| 33 | 761 | 163 | 29 | 14 | 1582 | 103 | 0 | 14 | 651 | | 81 | 0 | 14 | 448 | 1.70 | 0.41 | 0.78 | 1.45 | 8.09 | 2.08 |
| 34 | 761 | 163 | 29 | 14 | 1582 | 103 | 0 | 14 | 651 | | 81 | 0 | 14 | 448 | 1.70 | 0.41 | 0.78 | 1.45 | 8.09 | 2.08 |
| 35 | 761 | 163 | 23 | 14 | 1582 | 103 | 0 | 14 | 651 | | 81 | 0 | 14 | 448 | 1.70 | 0.41 | 0.78 | 1.45 | 8.09 | 2.08 |
| 36 | 761 | 163 | 18 | 14 | 1582 | 103 | 0 | 14 | 651 | | 81 | 0 | 14 | 448 | 1.70 | 0.41 | 0.78 | 1.45 | 8.09 | 2.08 |
| 37 | 1005 | 97 | 12 | 14 | 1697 | 164 | 0 | 14 | 1450 | 12 | 143 | 0 | 14 | 674 | 1.49 | 0.85 | 0.87 | 2.15 | 10.11 | 1.69 |
| 38 | 664 | 161 | (15) | 12 | 1460 | 93 | 0 | 14 | 778 | | 112 | 0 | 14 | 540 | 1.23 | 0.53 | 1.20 | 1.44 | 6.98 | 2.20 |

TABLE 2

| Ex. | S | $A_E$ % | g % | $T_L$ % | a* ($T_L$) | b* ($T_L$) | L* ($R_C$) | a* ($R_C$) | b* ($R_C$) | L* ($R_V$) | a* ($R_V$) | b* ($R_V$) | Shift a* | Shift b* | Deltacol ($R_V$) | Deltacol ($R_C$) |
|---|---|---|---|---|---|---|---|---|---|---|---|---|---|---|---|---|
| 1 | 1.92 | 42 | 24.7 | 47.4 | −6.5 | 0.9 | 44.1 | −4.7 | 5.4 | 41.0 | −4.4 | −12.9 | −1.6 | 3.1 | 2.5 | — |
| 2 | 1.94 | 39 | 24.8 | 48.1 | −6.5 | 2.4 | 46.9 | −8.3 | 4.5 | 46.9 | −2.6 | −13.3 | −3.0 | 2.2 | 2.5 | 3.6 |
| 3 | 1.93 | 42 | 23.2 | 44.9 | −7.2 | 1.1 | 42.2 | −7.5 | −0.4 | 50.1 | −3.6 | −12.1 | −1.7 | −0.1 | 1.5 | 3.0 |
| 4 | 1.95 | 40 | 24.6 | 47.8 | −7.0 | 1.4 | 42.3 | −6.0 | −1.7 | 48.4 | −3.5 | −12.5 | −2.2 | 0.6 | 1.9 | 2.4 |
| 5 | 1.95 | 45 | 24.7 | 48.3 | −8.4 | −3.5 | 37.8 | 3.7 | −6.0 | 37.6 | −2.4 | −3.4 | 0.9 | 3.5 | 2.1 | — |
| 6 | 1.95 | 46 | 24.7 | 48.2 | −8.5 | −3.3 | 37.5 | 3.2 | −5.4 | 37.7 | −2.4 | −3.3 | 0.8 | 3.6 | 2.1 | — |
| 7 | 1.94 | 41 | 24.8 | 48.2 | −7.8 | 2.2 | 46.8 | 7.1 | 5.8 | 47.0 | −4.9 | −13.3 | −1.7 | 2.9 | 1.8 | 1.9 |
| 8 | 1.93 | 42 | 24.4 | 47.2 | −7.6 | 2.4 | 45.5 | 6.1 | 5.8 | 46.2 | −4.5 | −13.4 | −1.5 | 3.0 | 1.9 | — |
| 9 | 1.95 | 42 | 24.7 | 48.1 | −7.7 | 1.8 | 45.8 | 6.1 | 5.8 | 45.8 | −4.9 | −12.3 | −1.6 | 3.4 | 1.8 | 1.9 |
| 10 | 1.95 | 42 | 24.7 | 48.2 | −8.0 | 1.5 | 45.5 | 5.9 | 5.8 | 45.0 | −4.9 | −12.2 | −1.6 | 3.5 | 1.7 | 2.0 |
| 11 | 1.94 | 44 | 24.7 | 48.0 | −8.3 | −0.2 | 43.8 | 4.6 | 5.5 | 41.6 | −4.9 | −10.9 | −0.6 | 3.4 | 1.9 | — |
| 12 | 1.94 | 43 | 24.7 | 48.0 | −8.1 | −0.8 | 43.6 | 4.2 | 5.6 | 40.9 | −4.8 | −8.8 | 0.0 | 3.5 | 2.0 | 2.0 |
| 13 | 1.92 | 41 | 24.5 | 47.0 | −6.7 | 1.5 | 41.9 | −3.2 | −7.0 | 50.1 | −4.8 | −9.7 | −3.2 | 0.0 | 2.5 | 4.4 |
| 14 | 1.95 | 39 | 24.5 | 47.7 | −6.5 | 1.1 | 43.4 | −6.6 | −3.2 | 50.7 | −4.5 | −9.3 | −2.2 | −0.2 | 2.4 | 3.3 |
| 15 | 1.97 | 40 | 24.8 | 48.9 | −7.0 | 1.0 | 42.7 | −5.6 | −1.8 | 47.6 | −4.6 | −10.9 | −0.9 | 0.0 | 2.2 | 2.6 |
| 16 | 1.94 | 44 | 24.8 | 48.0 | −7.8 | −1.0 | 43.4 | −0.2 | 5.2 | 38.2 | −4.9 | −11.1 | 0.6 | 3.4 | 2.2 | 1.7 |
| 17 | 2.03 | 40 | 25.1 | 50.8 | −7.5 | 2.2 | 43.4 | −4.6 | −1.7 | 44.6 | −5.0 | −14.1 | 1.1 | 1.5 | 2.5 | 3.8 |
| 18 | 1.94 | 43 | 24.9 | 48.4 | −8.0 | 0.7 | 46.6 | 5.7 | 6.3 | 44.2 | −5.1 | −11.2 | −2.9 | 3.7 | 1.3 | 2.0 |
| 18 | 1.95 | 45 | 24.8 | 48.4 | −8.6 | −1.3 | 42.5 | 2.0 | 5.0 | 38.6 | −4.9 | −9.1 | 0.2 | 3.3 | 1.8 | — |
| 20 | 1.97 | 45 | 25.0 | 49.3 | −8.8 | −4.1 | 39.1 | 7.6 | −0.1 | 35.9 | −2.5 | −3.3 | 1.1 | 3.1 | 1.6 | 2.8 |
| 21 | 1.93 | 44 | 25.0 | 48.1 | −8.0 | −4.0 | 39.7 | 6.4 | −0.5 | 35.2 | −3.7 | −5.4 | −0.3 | 3.9 | 1.4 | 2.7 |
| 22 | 1.99 | 43 | 24.6 | 48.9 | −6.9 | 2.1 | 43.8 | −7.3 | −3.7 | 38.5 | −3.6 | −5.4 | −2.6 | 2.8 | 1.8 | — |
| 23 | 1.99 | 43 | 24.6 | 48.9 | −6.3 | −0.2 | 43.5 | −7.2 | −0.9 | 39.4 | −4.1 | −6.8 | −2.2 | 2.9 | 1.8 | 3.6 |
| 24 | 1.93 | 43 | 24.1 | 46.6 | −8.2 | 2.9 | 44.3 | 3.5 | −1.3 | 42.8 | −4.8 | −12.0 | 1.1 | 2.6 | 1.5 | 2.3 |
| 25 | 1.96 | 43 | 24.9 | 48.8 | −8.4 | 2.2 | 53.4 | 6.1 | 1.5 | 46.4 | −5.1 | −10.0 | −3.3 | 2.0 | 1.7 | 6.8 |
| 26 | 1.98 | 44 | 24.6 | 48.7 | −6.7 | 1.6 | 45.3 | −5.7 | 0.4 | 38.2 | −4.6 | −8.5 | −1.6 | 2.7 | 1.8 | — |
| 27 | 1.97 | 43 | 24.5 | 48.2 | −6.4 | 0.2 | 44.4 | −6.5 | 0.1 | 39.2 | −4.7 | −10.3 | −1.8 | 2.9 | 1.8 | 3.7 |
| 28 | 1.97 | 40 | 24.3 | 47.9 | −7.2 | 2.7 | 42.9 | −5.2 | −4.5 | 49.1 | −3.5 | −13.9 | −3.6 | 1.8 | 2.2 | 2.7 |
| 29 | 1.94 | 43.7 | 23.0 | 44.8 | −7.1 | 3.5 | 45.9 | 2.0 | 5.8 | 45.3 | −6.6 | −16.8 | −1.6 | 4.0 | 1.9 | 4.9 |
| C1 | | 39.5 | | 36.1 | −11.6 | 1.8 | 41 | 3.9 | −20.2 | 32.5 | −1 | −19.2 | | | | |
| 31 | 1.91 | 38.8 | 24.4 | 46.5 | −6.3 | 0.1 | 43.2 | −7.2 | −2.4 | 51.4 | −2.5 | −12.4 | −3.7 | 1.2 | | |
| 32 | 1.94 | 39.6 | 24.0 | 46.5 | −6.7 | 1.6 | 43.2 | −7.5 | −2.7 | 51.3 | −4.3 | −11.6 | −3.1 | 0.8 | | |
| 33 | 1.93 | 40 | 25.0 | 48.3 | −7.0 | −0.6 | 41.5 | −4.8 | −1.5 | 47.4 | −1.4 | −10.2 | −3.5 | 0.1 | | |
| 34 | 1.95 | 39.6 | 23.9 | 46.5 | −7.0 | 1.9 | 43.0 | −6.5 | −2.7 | 51.1 | −2.4 | −12.2 | −3.6 | 1.5 | | |
| 35 | 1.90 | 39 | 24.4 | 46.4 | −5.2 | 0.7 | 41.1 | −3.9 | −3.4 | 48.9 | −3.2 | −12.4 | −3.1 | 1.3 | | |
| 36 | 1.93 | 39.6 | 23.8 | 46.0 | −11.1 | −3.1 | 44.7 | −9.3 | −3.0 | 51.1 | −1.0 | −8.0 | −1.2 | −0.7 | | |
| 37 | 1.96 | 39.6 | 25.9 | 50.6 | −8.2 | −1.5 | 38.3 | 4.7 | −4.0 | 37.2 | −0.9 | −10 | 1.1 | 4.9 | | |
| 38 | 1.93 | 37.6 | 25.1 | 48.4 | −5.3 | 3.2 | 41.7 | 0.5 | −2.9 | 48.4 | −6.9 | −13.5 | −2.2 | 1.2 | | |

The invention claimed is:

1. A transparent coated substrate comprising:
   a transparent substrate; and
   a solar-control multilayer stack formed on the transparent substrate, said solar-control multilayer stack further comprising:
      at least n functional layers comprising a material that reflects infrared radiation;
      (n+1) transparent dielectric coatings; and
      a metallic absorbent layer that is absorbent in the visible radiation spectrum,
   wherein:
   each functional layer is surrounded by transparent dielectric coatings;
   n is selected from the group consisting of 3 or 4;
   the metallic absorbent layer is located on an inside of the stack;
   a ratio of an optical thickness of a third transparent dielectric coating positioned between a second functional layer and a third functional layer, starting from the substrate, to an optical thickness of a final transparent dielectric coating positioned beyond a last functional layer is between 1.25 and 3.0, and
   when the solar-control multilayer stack is deposited on a sheet of standard soda-lime clear float glass having a thickness of 6 mm and assembled with a clear glass sheet having a thickness of 4 mm, a resulting double glazing has a solar factor of 26% or less.

2. The transparent coated substrate of claim 1, wherein the ratio of the optical thickness of the transparent dielectric coating positioned between the second and third functional layers, starting from the substrate, to the optical thickness of the final transparent dielectric coating positioned beyond the last functional layer is between 1.3 and 2.6.

3. The transparent coated substrate of claim 1, wherein a ratio of the optical thickness of the transparent dielectric coating positioned between the second and third functional layers, starting from the substrate, to an optical thickness of a transparent dielectric coating positioned between a first functional layer and the second functional layer is between 0.3 and 1.7.

4. The transparent coated substrate of claim 1, wherein a ratio of an optical thickness of a transparent dielectric coating positioned between a first functional layer and the second functional layer, starting from the substrate, to an optical thickness of a transparent dielectric coating positioned between the substrate and the first functional layer is between 1.15 and 3.4.

5. The transparent coated substrate of claim 1, wherein a ratio of an optical thickness of a transparent dielectric coating positioned between the substrate and a first functional layer, starting from the substrate, to the optical thickness of the transparent dielectric coating positioned beyond the last functional layer is between 0.3 and 3.3.

6. The transparent coated substrate of claim 1, wherein a ratio of the optical thickness of the transparent dielectric coating positioned between the second and third functional layers, starting from the substrate, to a geometric thickness of the third functional layer is between 6.3 and 13.

7. The transparent coated substrate of claim 1, wherein a ratio of a geometric thickness of the third functional layer, starting from the substrate, to a geometric thickness of the second functional layer is between 0.45 and 2.8.

8. The transparent coated substrate of claim 1, wherein the metallic absorbent layer is positioned in an immediate proximity of a functional layer.

9. The transparent coated substrate of claim 8, wherein the metallic absorbent layer is positioned directly on a functional layer, such that the metallic absorbent layer and the functional layer have a common interface.

10. The transparent coated substrate of claim 1, wherein the solar-control multilayer stack comprises a single absorbent layer.

11. The transparent coated substrate of claim 1, wherein the solar-control multilayer stack comprises several absorbent layers, each layer positioned in an immediate vicinity of a functional layer.

12. The transparent coated substrate of claim 1, wherein the at least n functional layers comprise silver or a silver alloy.

13. The transparent coated substrate of claim 1, wherein the metallic absorbent layer has a thickness of at most 7 nm.

14. The transparent coated substrate of claim 1, wherein when the solar-control multilayer stack is deposited on a sheet of standard soda-lime clear float glass having a thickness of 6 mm, the total light absorption $A_L$ of a resulting coated monolithic glazing is at least 25%.

15. The transparent coated substrate of claim 1, wherein variations of a* and b* in reflection on a substrate side, during a variation of an angle of observation of between 0 and 55°, are at most 3.7 as an absolute value.

16. The transparent coated substrate of claim 1, wherein the substrate has a selectivity of greater than 1.9.

17. The transparent coated substrate of claim 1, wherein the substrate comprises a sheet of standard soda-lime-silica glass.

18. The transparent coated substrate of claim 1, wherein geometric thicknesses of first, second and third functional layers (respectively IR1, IR2 and IR3), starting from the substrate, are increasing, in that a ratio of an optical thickness of a second transparent dielectric coating positioned between the first and the second functional layers, starting from the substrate, to an optical thickness of a first transparent dielectric coating positioned between the substrate and the first functional layer is between 1.25 and 3.1, and in that a ratio of the optical thickness of a third transparent dielectric coating positioned between the second and the third functional layers, starting from the substrate, to a geometric thickness of the third functional layer is between 6.3 and 13.

19. The transparent coated substrate of claim 1, wherein geometric thicknesses of first, second and third functional layers, starting from the substrate, are decreasing, in that a ratio of the optical thickness of a third transparent dielectric coating positioned between the second and the third functional layers, starting from the substrate, to a geometric thickness of the third functional layer is between 7 and 11, and in that a ratio of an optical thickness of a first transparent dielectric coating positioned between the substrate and first functional layer to the optical thickness of a final transparent dielectric coating positioned beyond the last functional layer is between 1 and 2.5.

20. The transparent coated substrate of claim 1, wherein a geometric thickness of the second functional layer, starting from the substrate, is at least 5% greater than a geometric thickness of each of a first functional layer and the third functional layer, starting from the substrate, in that a ratio of an optical thickness of the third transparent dielectric coating positioned between the second and the third functional layers, starting from the substrate, to a geometric thickness of the third functional layer is between 7.2 and 13 and in that a ratio of an optical thickness of a first transparent dielectric coating positioned between the substrate and the first functional layer to the optical thickness of the final transparent dielectric coating positioned beyond the last functional layer is between 1.3 and 3.3.

21. The transparent coated substrate of claim 1, wherein geometric thicknesses of three functional layers, starting from the substrate, are equal to within a difference of 10%, in that a ratio of an optical thickness of a first transparent dielectric coating positioned between the substrate and the first functional layer to the optical thickness of the final transparent coating positioned beyond the last functional layer is between 1.2 and 2.1, and in that a ratio of an optical thickness of the third-transparent dielectric coating positioned between the second and third functional layers, starting from the substrate, to an optical thickness of a second-transparent dielectric coating positioned between the first and second functional layers, starting from the substrate, is between 0.5 and 0.8.

22. The transparent coated substrate of claim 1, wherein a geometric thickness of the second functional layer, starting from the substrate, is at least 10% less than a geometric thickness of one of a first functional layer and the third functional layer, starting from the substrate, and is less than or equal to a thickness of the other of the first and third functional layers, and in that the ratio of the optical thickness of the third transparent dielectric coating positioned between the second and third functional layers, starting from the substrate, to the optical thickness of the final transparent dielectric coating positioned beyond the last functional layer, starting from the substrate, is less than 2.6.

23. The transparent coated substrate of claim 22, wherein the ratio of the optical thickness of the third transparent dielectric coating positioned between the second and third functional layers, starting from the substrate, to a geometric thickness of the third functional layer is between 6.6 and 10, and in that a ratio of the geometric thickness of the third functional layer to the second functional layer is between 1 and 2.6.

24. A multiple glazing, comprising the transparent coated substrate of claim 1.

25. A laminated glazing, comprising the transparent coated substrate of claim 1 joined to a sheet of glassy material by an adhesive plastic.

26. The transparent coated substrate of claim 1, wherein a thickness of the absorbent layer is between 0.5 nm and 7 nm when the transparent coated substrate is a finished product ready to be assembled in a multiple glazing or a laminated glazing.

27. The transparent coated substrate of claim 1, wherein the absorbent layer is detectable when the transparent coated substrate is a finished product ready to be assembled in a multiple glazing or a laminated glazing.

28. The transparent coated substrate of claim 1, wherein the coated substrate has been subjected to a heat treatment of above 560° C.

29. The transparent coated substrate of claim 1, wherein in the absorbent layer an atomic ratio of oxygen relative to the metal of the absorbent layer is at least 50% less than an atomic ratio of a stable stoichiometric oxide of the metal of the absorbent layer.

30. The transparent coated substrate of claim 1, wherein the absorbent layer is detectable by X-ray photo-electronic spectroscopy profiling with a profiling gun using argon ions in the energy range from 1 to 3 keV.

31. A transparent coated substrate comprising:
a transparent substrate; and
a solar-control multilayer stack formed on the transparent substrate, said solar-control multilayer stack further comprising:
at least n functional layers comprising a material that reflects infrared radiation;
(n+1) transparent dielectric coatings;
a metallic absorbent layer that is absorbent in the visible radiation spectrum and is located on an inside of the stack, and
a barrier film in direct contact with the metallic absorbent layer and in direct contact with one of the dielectric coatings,
wherein:
each functional layer is surrounded by transparent dielectric coatings;
n is selected from the group consisting of 3 or 4;
a ratio of an optical thickness of a third transparent dielectric coating positioned between a second functional layer and a third functional layer, starting from the substrate, to an optical thickness of a final transparent dielectric coating positioned beyond a last functional layer is between 1.25 and 3.0;
the transparent coated substrate has a light transmission ($T_L$) of 54% or less, and
when the solar-control multilayer stack is deposited on a sheet of standard soda-lime clear float glass having a thickness of 6 mm and assembled with a clear glass sheet having a thickness of 4 mm, a resulting double glazing has a solar factor of 28% or less.

32. The transparent coated substrate of claim 31, wherein each functional layer comprises silver, and
wherein each absorbent layer comprises a material selected from the group consisting of Ni, Cr, W, Nb, Ti, Ni, Mo, Co, Al, Y, Zn, and Mg.

33. The transparent coated substrate of claim 31, wherein a thickness of the absorbent layer is between 0.5 nm and 7 nm.

34. The transparent coated substrate of claim 31, wherein the transparent coated substrate is a finished product ready to be assembled in a multiple glazing or a laminated glazing.

* * * * *